United States Patent [19]
Amemiya et al.

[11] Patent Number: 5,970,183
[45] Date of Patent: Oct. 19, 1999

[54] DETECTING AN OUTER SHAPE OF AN ORIGINAL IMAGE AND CONTROLLING TO INHIBIT IMAGE FRAME PROCESSING IN ACCORDANCE WITH THE DETECTION RESULT

[75] Inventors: Masami Amemiya, Tokyo; Masashi Shimizu, Kawasaki, both of Japan

[73] Assignee: Canon Kabushiki Kaisha, Tokyo, Japan

[21] Appl. No.: 08/772,946

[22] Filed: Dec. 24, 1996

[30] Foreign Application Priority Data

Dec. 26, 1995 [JP] Japan .................................. 7-338892
Jan. 10, 1996 [JP] Japan .................................. 8-001930
Jan. 16, 1996 [JP] Japan .................................. 8-021663

[51] Int. Cl.$^6$ ........................................ G06K 9/20
[52] U.S. Cl. ................................. 382/282; 382/286
[58] Field of Search ........................ 382/282, 286, 382/312, 317, 284; 358/448, 453, 464

[56] References Cited

U.S. PATENT DOCUMENTS

| | | | |
|---|---|---|---|
| 4,769,852 | 9/1988 | Hashimoto et al. | 382/45 |
| 4,870,500 | 9/1989 | Nagashima | 358/443 |
| 5,040,078 | 8/1991 | Yahara | 358/448 |
| 5,065,257 | 11/1991 | Yamada | 358/463 |
| 5,392,135 | 2/1995 | Amemiya | 358/444 |
| 5,488,485 | 1/1996 | Amemiya | 358/444 |
| 5,493,415 | 2/1996 | Mita et al. | 358/444 |
| 5,585,945 | 12/1996 | Ikeda et al. | 358/540 |
| 5,708,513 | 1/1998 | Hasuo et al. | 358/450 |

*Primary Examiner*—Yon J. Couso
*Attorney, Agent, or Firm*—Fitzpatrick, Cella, Harper & Scinto

[57] ABSTRACT

An original image is read, image data corresponding to a black frame is added to the read original image data, and the image data with the frame is output. In this case, when the shape of the read original image data is not a rectangular shape, since the black frame is not added as intended, binarized data of the read image before the image frame is added is directly output.

42 Claims, 29 Drawing Sheets

READ ORIGINAL IMAGE

BINARIZED ORIGINAL IMAGE

AFTER IMAGE FRAME ADDITION PROCESSING

AFTER IMAGE FRAME ERASING PROCESSING

READ ORIGINAL IMAGE

BINARIZED ORIGINAL IMAGE

AFTER IMAGE FRAME ADDITION PROCESSING

AFTER IMAGE FRAM ERASING PROCESSING

READ ORIGINAL IMAGE

READ ORIGINAL IMAGE

DETECTED OUTER SHAPE

DETECTED OUTER SHAPE

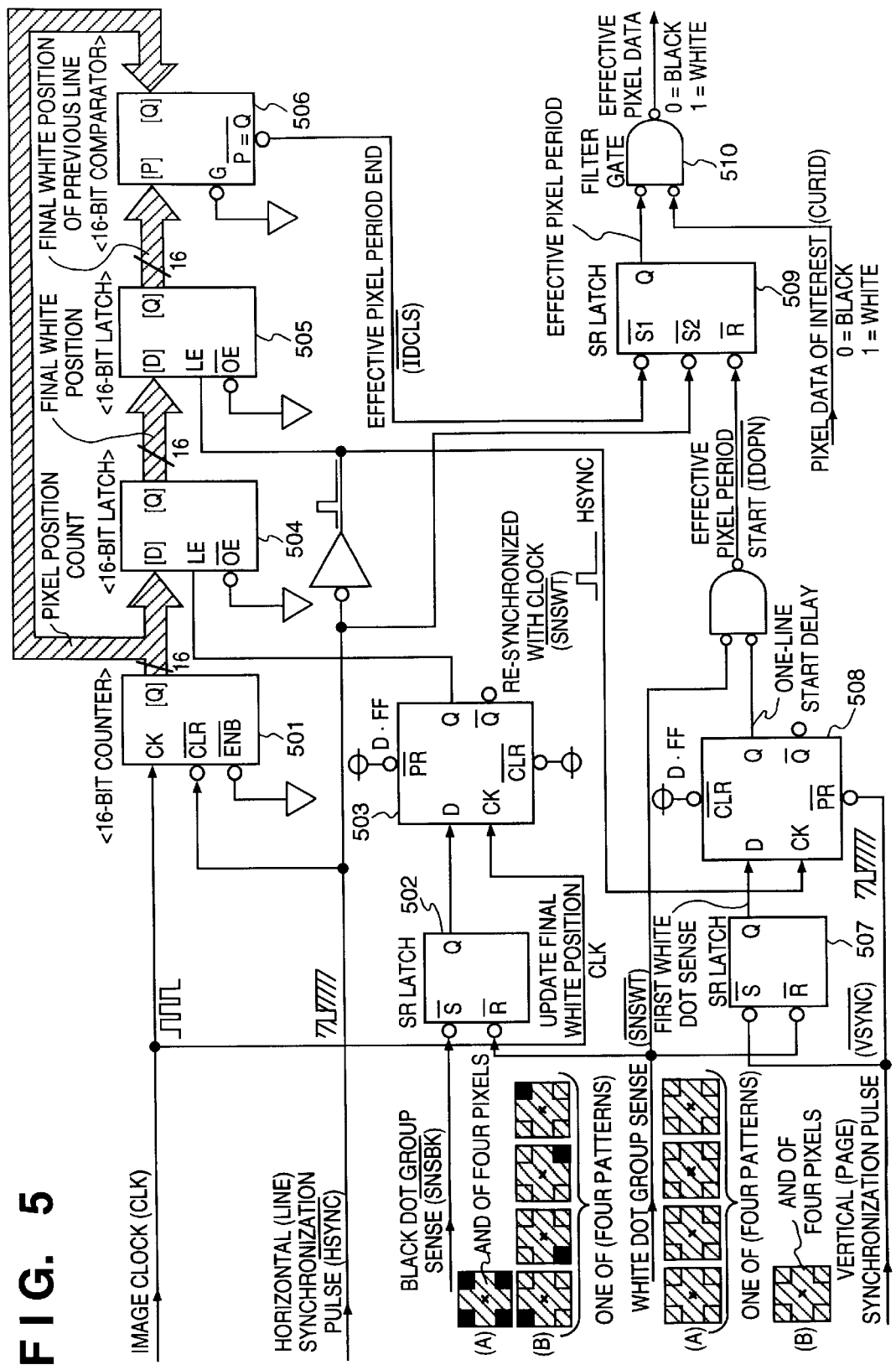
F I G. 5

SELECT IMAGE
FRAME ERASING
MODE WHEN ORIGINAL
SIZE ≥ PAPER SIZE

SELECT IMAGE
FRAME ADDITION
MODE WHEN ORIGINAL
SIZE < PAPER SIZE

DETECTING AN OUTER SHAPE OF AN ORIGINAL IMAGE AND CONTROLLING TO INHIBIT IMAGE FRAME PROCESSING IN ACCORDANCE WITH THE DETECTION RESULT

BACKGROUND OF THE INVENTION

The present invention relates to an image processing apparatus and method and, more particularly, to an image processing apparatus and method, which electrically read an original image, perform image processing of the read image, and output the processed image to an external apparatus.

In recent years, as image reading apparatuses for generating an image signal by electrically reading an original image, so-called scanners have been commercially available. A conventional monochrome scanner normally uses a white plate as a pressing plate that serves as the background of an original reading unit. A case will be examined below wherein the output original image read by scanner is received and displayed by an image processing apparatus (e.g., a host computer or the like) on the output side or is temporarily stored in an external storage device, and is reproduced and displayed or printed out later. In this case, when the size of the original image is smaller than that of the display screen of a display on the host computer side or the size of a recording medium or the like used for printing out the image, the boundary between the original image and the background cannot be recognized, as shown in, e.g., FIG. 2D, and hence, an accurate original size cannot often be determined. This is because both the background color of the original and the pressing plate are white. On the other hand, character images and the like in the original image appear to float in the air with respect to the background, and the image position cannot be discriminated, resulting in image information which is not easy to see.

In order to solve such problems, the following method has been proposed. That is, in the conventional scanner, the background of the original reading unit is painted black, and an original image 201 is read by adding a black background 202 thereto, as shown in FIG. 2A. With this method, the size information of the original image can be provided upon reading an image, and hence, this means is effective for solving the above-mentioned problems.

In this case, no problem is posed when the original image is displayed on the display of the host computer, as described above. However, when the read image is to be printed out, the following problems are posed. That is, since the solid black portion added around the original image is printed out as it is, a recording agent such as ink, toner, or the like of a printer apparatus is consumed in large quantity, and at the same time, unwanted ink or toner scattering frequently occurs inside the apparatus, thus considerably contaminating the respective members.

In order to solve the new problem, the following method (image frame addition processing) has been proposed. That is, when an image read by the scanner is printed out, a software program on the host computer side detects the boundary line portion between the original image and the surrounding black background portion, and converts the color of a portion other than a thin line portion of the surrounding portion to match the foundation color of the original. With this method, the image on which only the original size information is left as a thin-line image frame can be output to the printer apparatus.

However, since the image frame addition processing in the conventional scanner is realized by software, it is normally considerably low-speed processing, thus requiring a long time for printing out the image. Since not all application programs, which run on the host computer and use the scanner, always support the above-mentioned image frame addition function, the image frame addition processing cannot be versatilely applied to all the application programs that use the scanner.

Therefore, in order to solve the above-mentioned problems in the conventional scanner, it is effective to add a hardware image frame addition means which performs sequential processing equivalent to the above-mentioned software processing in synchronism with the reading operation of the original image, i.e., in synchronism with the transfer clocks of pixel data.

A case will be examined below wherein an image frame addition circuit that can attain high-speed sequential processing is arranged in the scanner, and is operated all the time. Assume that an original image 301 having a halftone (e.g., red) foundation portion 303 in a portion contacting a surrounding portion (black region) 302 of the original image, as shown in, e.g., FIG. 3A, is to be processed. In this case, the image frame addition circuit erroneously recognizes the halftone region (red region) 303 contacting the surrounding portion of the original image as the background portion 302. As a result, the halftone region is erroneously converted into a white region upon printing out, and a strange image different from the original image 301 is transmitted to the host computer side, as shown in FIGS. 3C and 3D.

In order to avoid such problem, it is, of course, possible to add a means for manually bypassing the image frame processing function to the scanner. In this case, the operator checks the original image, and can disable the image frame processing function in advance when the above-mentioned original image is to be read.

However, the method of manually bypassing the image frame processing function is effective for a flat-bed scanner which can start reading after the operator sets an original image one by one on the scanner. However, when an ADF (auto document feeder) unit is added to the flat-bed scanner, or a sheet-through (original feed type) scanner which reads an original image by separating an original image one by one from a stack of a plurality of original images and successively feeding the original images, or the like is used, it is difficult for the operator to check each original image, and hence, the above-mentioned method cannot be an effective solution.

SUMMARY OF THE INVENTION

The present invention has been made to solve the above-mentioned problems, and has as its object to provide an image processing apparatus and method which can realize high-speed, accurate image frame addition processing.

It is another object of the present invention to provide an image processing apparatus and method, which can prevent a strange image from being generated due to operation errors when image frame processing is performed for a stack of original images, and can continuously perform the image frame processing and the print-out processing of a plurality of original images without being attended by any operator.

It is still another object of the present invention to provide an image reproduction apparatus and method, which can continuously read out a large number of original images having various sizes, can automatically perform optimal image frame processing for these original images without being attended by any operator, and can continuously print them out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a circuit diagram showing the arrangement of the image frame processing unit in the first embodiment;

DETAILED DESCRIPTION OF THE PREFERRED EMBODIMENTS

The preferred embodiments according to the present invention will be described in detail hereinafter with reference to the accompanying drawings.

<First Embodiment>

Figure 1:
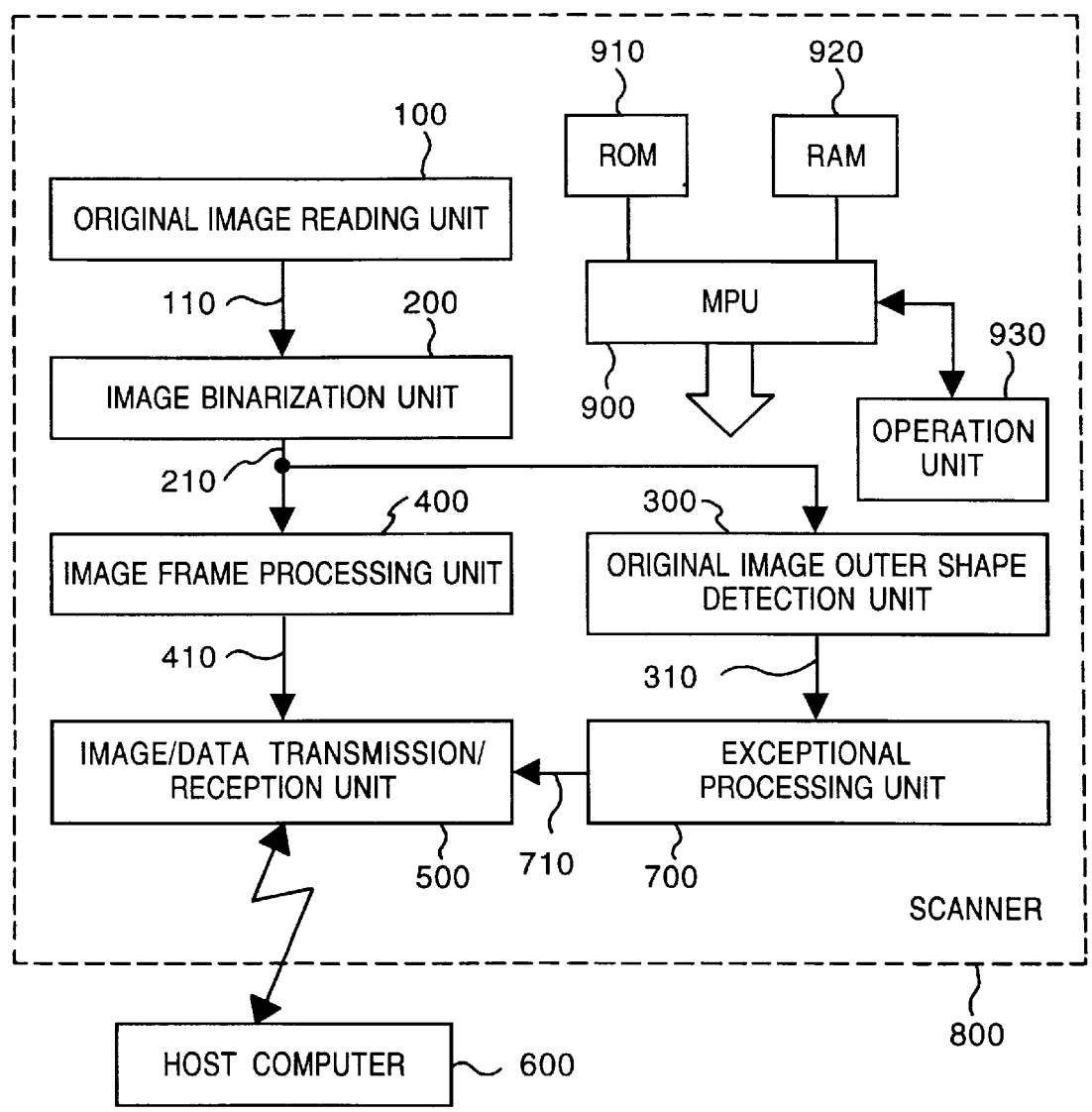
FIG. 1 is a block diagram showing the basic arrangement of a scanner according to the first embodiment of the present invention.

FIG. 1 shows the basic block arrangement of a scanner 800 as an image processing apparatus according to this embodiment. Referring to FIG. 1, reference numeral 800 denotes a scanner, which is connected to an external host computer 600 via a predetermined interface to allow communications therebetween. In this arrangement, an original image signal is read by the scanner 800, and is processed by the host computer 600. In the scanner 800, reference numeral 100 denotes an original image reading unit for reading an original image together with the background in a color different from the foundation color of an original; and 200, an image binarization unit for converting image information 110 read by the original image reading unit 100 into pixel signals expressed by two, i.e., black and white levels using a digital comparator and the like. Reference numeral 300 denotes an original image outer shape detection unit for detecting the outer shape of the original image by using pixel signals 210 binarized by the image binarization unit 200 and by utilizing the fact that the foundation color (white) in the original is different from the background color (black) outside the original. When the detected outer shape is an irregular shape, the unit 300 outputs an irregular shape detection signal 310 to an exceptional processing unit 700. Reference numeral 400 denotes an image frame processing unit for performing image frame processing that adds or erases an image frame to or from the original image by similarly utilizing the different background colors. Reference numeral 500 denotes an image/data transmission/reception unit for transmitting binary pixel signals subjected to the image frame processing to an external apparatus and for transmitting/receiving command/status data and the like to/from an apparatus connected on the output side (the host computer 600 in this embodiment). Reference numeral 700 denotes an exceptional processing unit which operates upon reception of the irregular shape detection signal 310 when the original image outer shape detection unit 300 determines that the outer shape of the currently read original (target original image) is an irregular shape. Reference numeral 900 denotes an MPU which systematically controls the respective units in the scanner 800 in accordance with the control program stored in a ROM 910. Reference numeral 920 denotes a RAM which is used as the work area of the MPU 900. Reference numeral 930 denotes an operation unit which has buttons used for generating various instructions, and a display unit for displaying messages.

The scanner of this embodiment has the above-mentioned arrangement and image data flow. Especially, this embodiment has the original image outer shape detection unit 300 as its characteristic arrangement. Since the original image outer shape detection unit 300 detects whether or not the shape of the original itself in processing is an irregular shape, it can also be used for the purpose of rejecting such original image, as a matter of course. However, this embodiment is characterized in that the original image outer shape detection unit 300 makes discrimination for the purpose of detecting operation errors of the image frame processing unit 400.

Figure 2A:
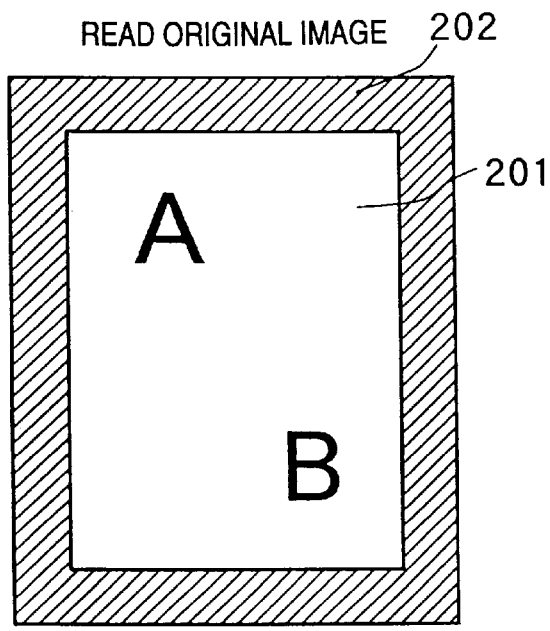
FIGS. 2A to 2D are views for explaining the normal operation of an image frame processing unit in the first embodiment.
Figure 2B:
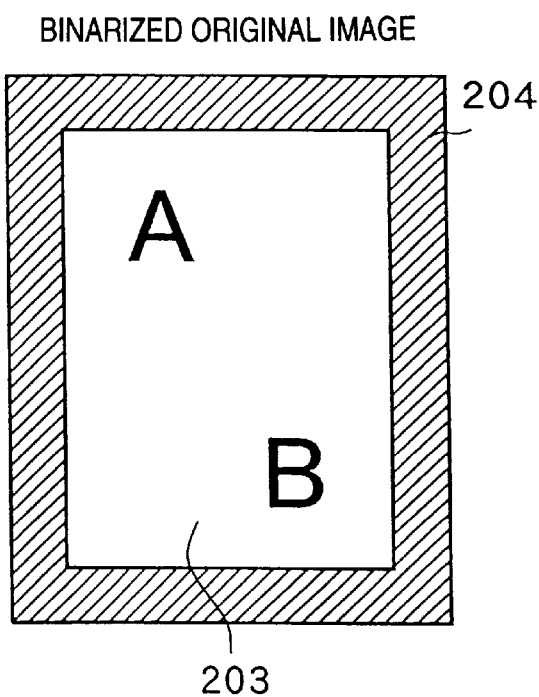
Figure 2C:
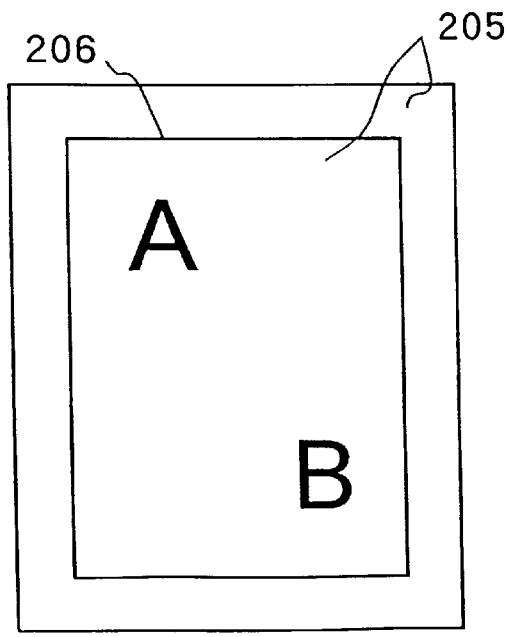
Figure 2D:
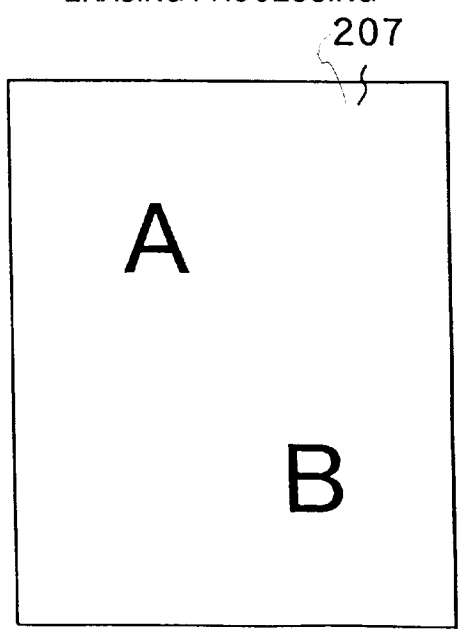

An example of the normal operation of the image frame processing unit 400 will be explained below with reference to FIGS. 2A to 2D. FIG. 2A shows an example of an original image read together with the background by the original image reading unit 100. In this embodiment, an original 201 with a white foundation is read while being added with a black background 202. FIG. 2B shows the original image binarized by the image binarization unit 200. Each pixel in a foundation 203 of the original image is binarized to "0", and each pixel in a black background 204 is binarized to "1". The subsequent original image outer shape detection unit 300 and the image frame processing unit 400 perform processing on the basis of binary signals 210. FIGS. 2C and 2D show output images 410 respectively processed by the image frame processing unit 400. The image shown in FIG. 2C is an image with an image frame, which is obtained by leaving a black foundation around the original as a thin line, and the image shown in FIG. 2D is an image without an image frame, which is obtained by converting the entire black foundation portion into white. More specifically, in FIG. 2C, each pixel in a thin line 206 as the image frame is converted into "1", and each pixel in the remaining foundation and a background 205 is converted into "0". On the other hand, in FIG. 2D, all pixels in the foundation and a background 207 are converted into "0".

In the above-mentioned example, the image frame processing is normally performed. A case will be explained below with reference to FIGS. 3A to 3D wherein the image frame processing unit 400 does not operate normally, i.e., errors have occurred.

FIGS. 3A to 3D show images in the states corresponding to FIGS. 2A to 2D. In this case, an original image to be read locally has a red foundation portion. More specifically, in FIG. 3A, reference numeral 301 denotes a white original foundation; 302, a black background; and 303, a red original foundation. As a result of the binarization processing of this original, each pixel in the red original foundation 303 is binarized to level "1" as in the black background, as indicated by 305 in FIG. 3B. Therefore, in FIG. 3B, both the red original foundation and the black background are contiguous with each other to have level "1".

Figure 3A:
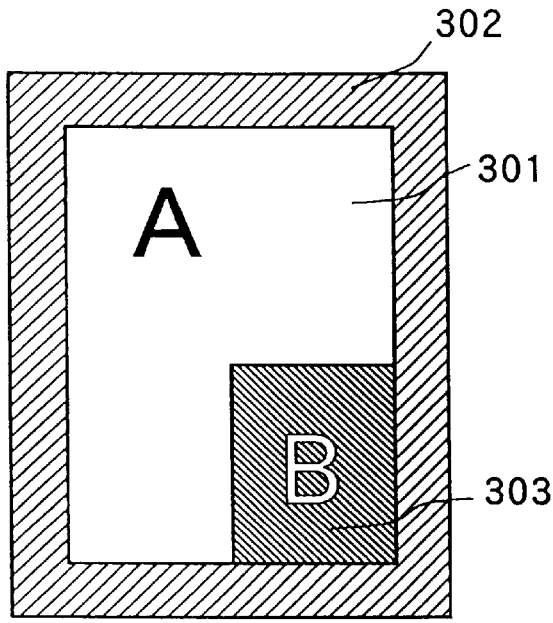
FIGS. 3A to 3D are views for explaining operation errors of the image frame processing unit in the first embodiment.
Figure 3B:
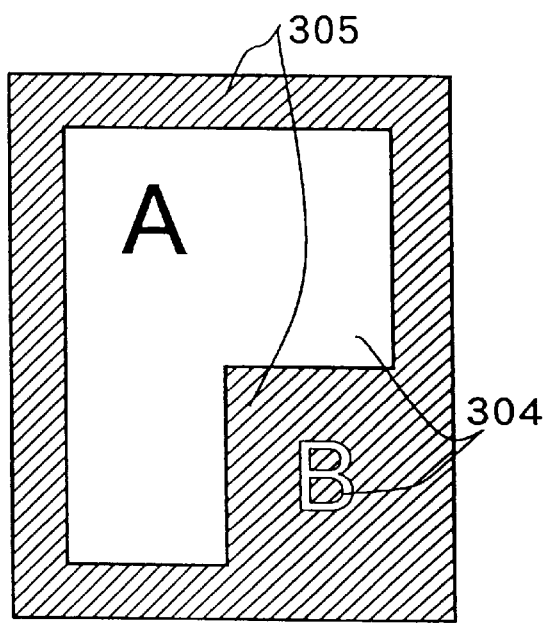
Figure 3C:
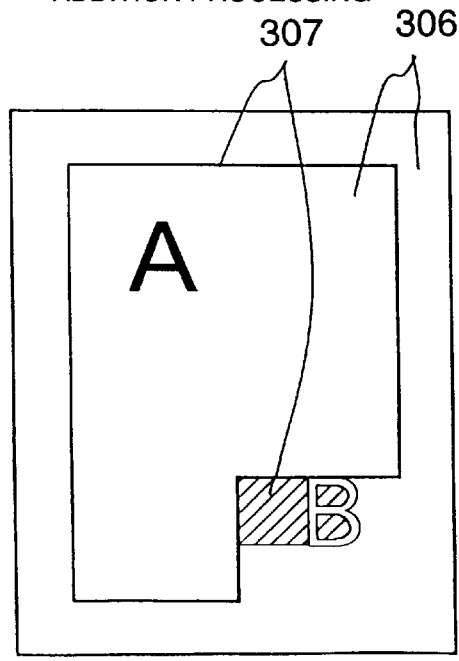
Figure 3D:
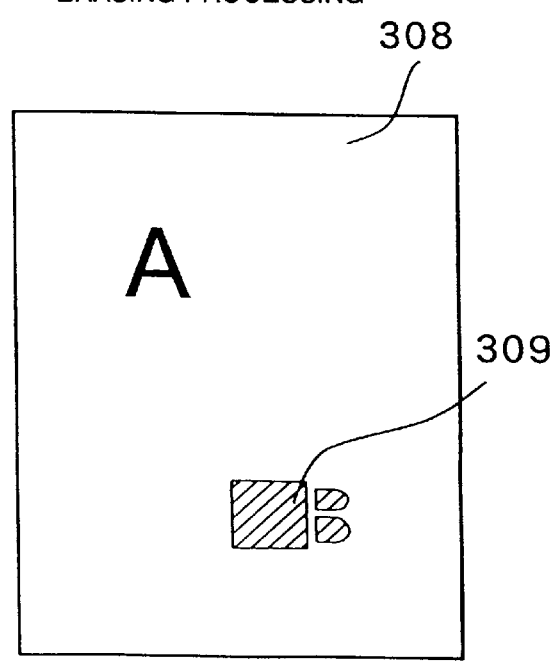

When the binary image shown in FIG. 3B is to be subjected to the image frame processing of the image frame processing unit 400, the image frame cannot be appropriately discriminated since sequential processing is performed in the main scanning direction and the sub-scanning direction, as will be described in detail later. Therefore, strange images shown in FIGS. 3C and 3D are generated. In FIG. 3C, each pixel in portions 306 is converted into "0", and each pixel in portions 307 is converted into "1". In FIG. 3D, each pixel in a portion 308 is converted into "0", and each pixel in a portion 309 is converted into "1".

In this embodiment, in order to avoid errors shown in FIGS. 3A to 3D, the original image outer shape detection unit 300 detects an original image which may cause conversion errors shown in FIGS. 3A to 3D.

Figure 4A:
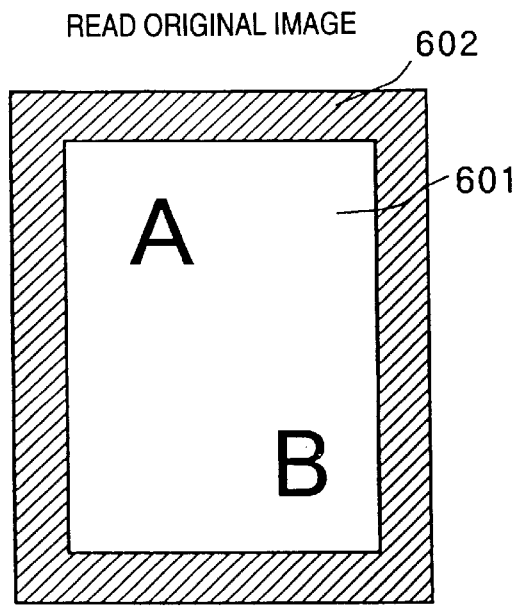
FIGS. 4A to 4D are views showing an example upon detecting the outer shape in the first embodiment.
Figure 4B:
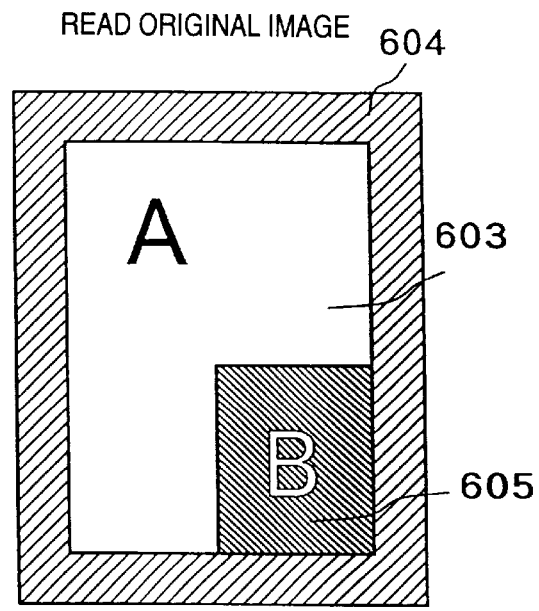
Figure 4C:
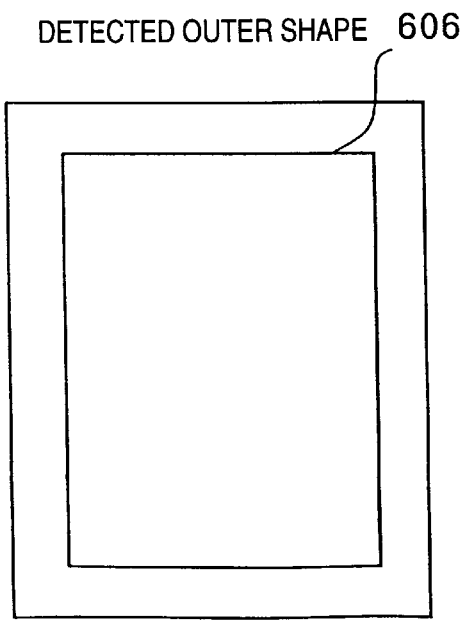
Figure 4D:
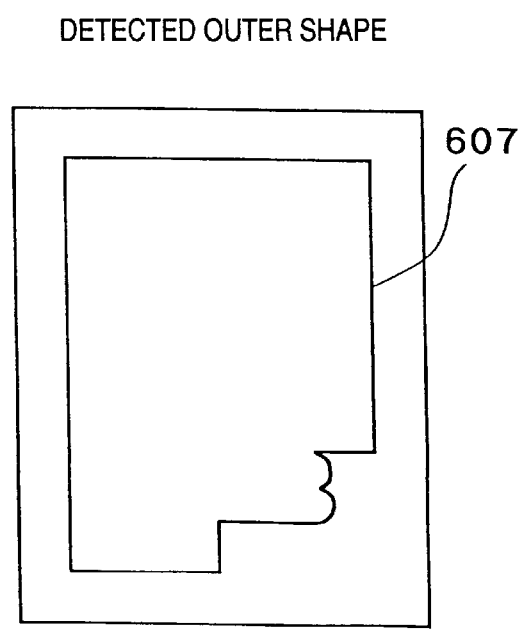

The discrimination method of the original image outer shape in the original image outer shape detection unit 300 will be described below with reference to FIGS. 4A to 4D. FIGS. 4A and 4B respectively show the same original images as those shown in FIGS. 2A and 3A, and reference numeral 605 in FIG. 4B denotes a red foundation region. When these original images are evaluated by the original image outer shape detection unit 300, they are respectively recognized as outer shapes 606 and 607 shown in FIGS. 4C and 4D. As shown in FIGS. 4C and 4D, the evaluated outer shapes 606 and 607 are equivalent to the outermost edges of the images after the image frame addition processing. Therefore, when the image frame processing in the image frame processing unit 400 normally ends, the image frame shape becomes "rectangular", as indicated by 606 in FIG. 4C. On the other hand, when the image frame processing does not normally end, i.e., when errors have occurred, the image frame shape includes cutout portions and becomes non-rectangular, i.e., has an "irregular shape", as indicated by 607 in FIG. 4D.

The original image outer shape detection unit 300 detects an irregular shape in accordance with whether or not the outer shape is a rectangle. When an irregular shape is detected, the irregular detection signal 310 is activated to trigger the exceptional processing unit 700.

The exceptional processing unit 700 is triggered by the irregular detection signal 310 output from the original image outer shape detection unit 300 and performs one or a combination of a plurality of the following exceptional processing operations (1) to (3).

(1) The original feeding operation is stopped, the original image reading operation is suspended, and the image data transfer operation is suspended.

(2) The operator is directly informed that the image frame processing cannot be normally performed by, e.g., displaying an original shape error message on the display unit or the like of the operation unit 930 of the scanner 800.

(3) A message indicating that an original reading error has occurred is sent to the host computer 600.

For example, when the exceptional processing unit 700 sets a combination of all the exceptional processing operations (1), (2), and (3), i.e., the processing for suspending the original reading operation, displaying an original shape error message on the scanner 800, and informing the host computer 600 of an original reading error, as an exceptional processing means, the image frame processing for the read original image can be controlled solely by the scanner 800. Such control is effective, e.g., when the application software on the host computer 600 side does not participate in the image frame processing. When such exceptional processing is generated, the host computer 600 side performs the same operation (pauses the operation in progress) as that performed when a paper jam has occurred (when the original to be read jams the apparatus), and the error cause is displayed on the scanner 800, thereby informing the operator of the cause.

Note that one or a combination of the above-mentioned three exceptional processing operations to be performed by the exceptional processing unit 700 when the original image outer shape detection unit 300 outputs an irregular shape detection signal may be set by the operation panel arranged on the scanner main body. Alternatively, when the scanner is connected to the host computer to allow two-way or full duplex communications, the host computer may send a command indicating one or a combination of the three error processing operations upon detecting an irregular shape when it sends a read command.

In any case, the set information is stored in a predetermined area in the RAM 920. However, the above description does not apply when the operations to be performed are selected using dip switches or the like.

FIG. 5 shows in detail the circuit arrangement of the image frame processing unit 400, and the arrangement of the unit 400 will be described below.

Figure 6:
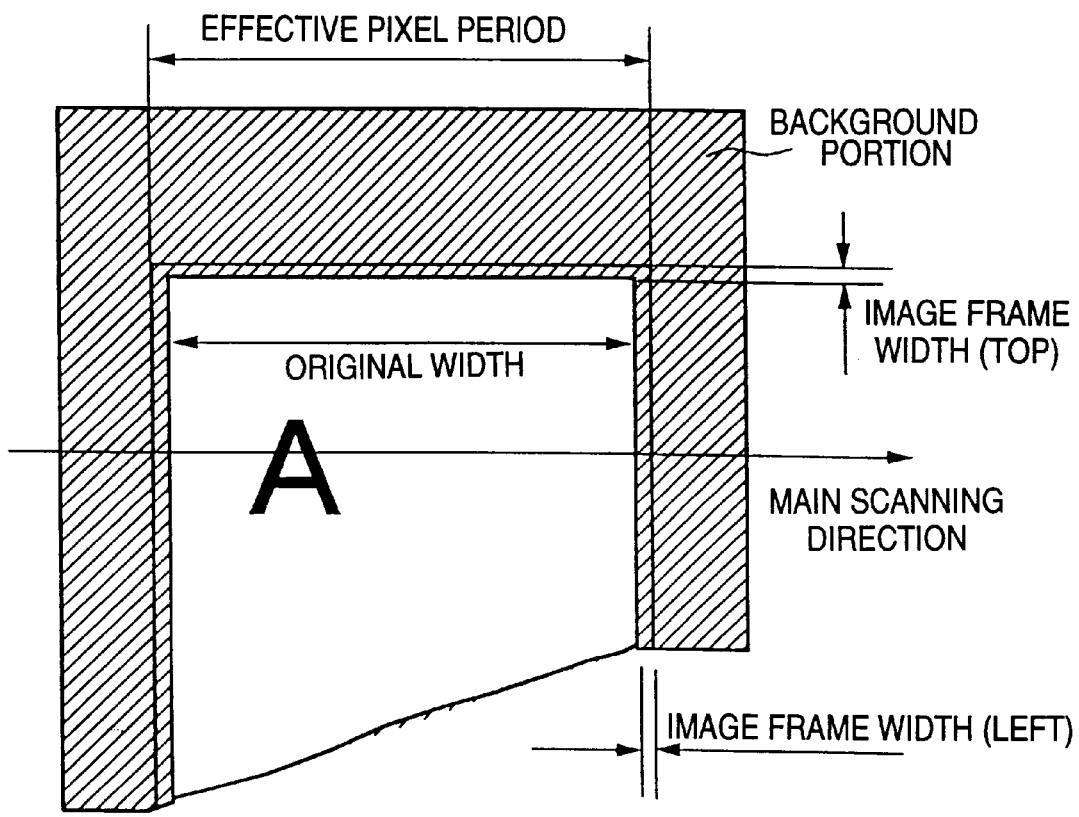
FIG. 6 is a view showing the effective pixel period in the image frame addition processing of the first embodiment.

The image frame processing in the image frame processing unit 400 in FIG. 5 will be briefly described below with reference to FIG. 6. In the image frame processing of this embodiment, as shown in FIG. 6, effective pixel period signals representing an effective pixel period are sequentially generated for the current main scanning line. At this time, the effective pixel period signal is enabled at a position immediately before the left end, in the main scanning direction, of the original, and is disabled at a position immediately after the right end of the original (in the non-effective period, the image signal is forcibly converted into white level), thereby leaving black background portions each having a width of several dots corresponding to the image frame width on the right and left sides of the original. More specifically, the black portions form an image frame.

Figure 7:
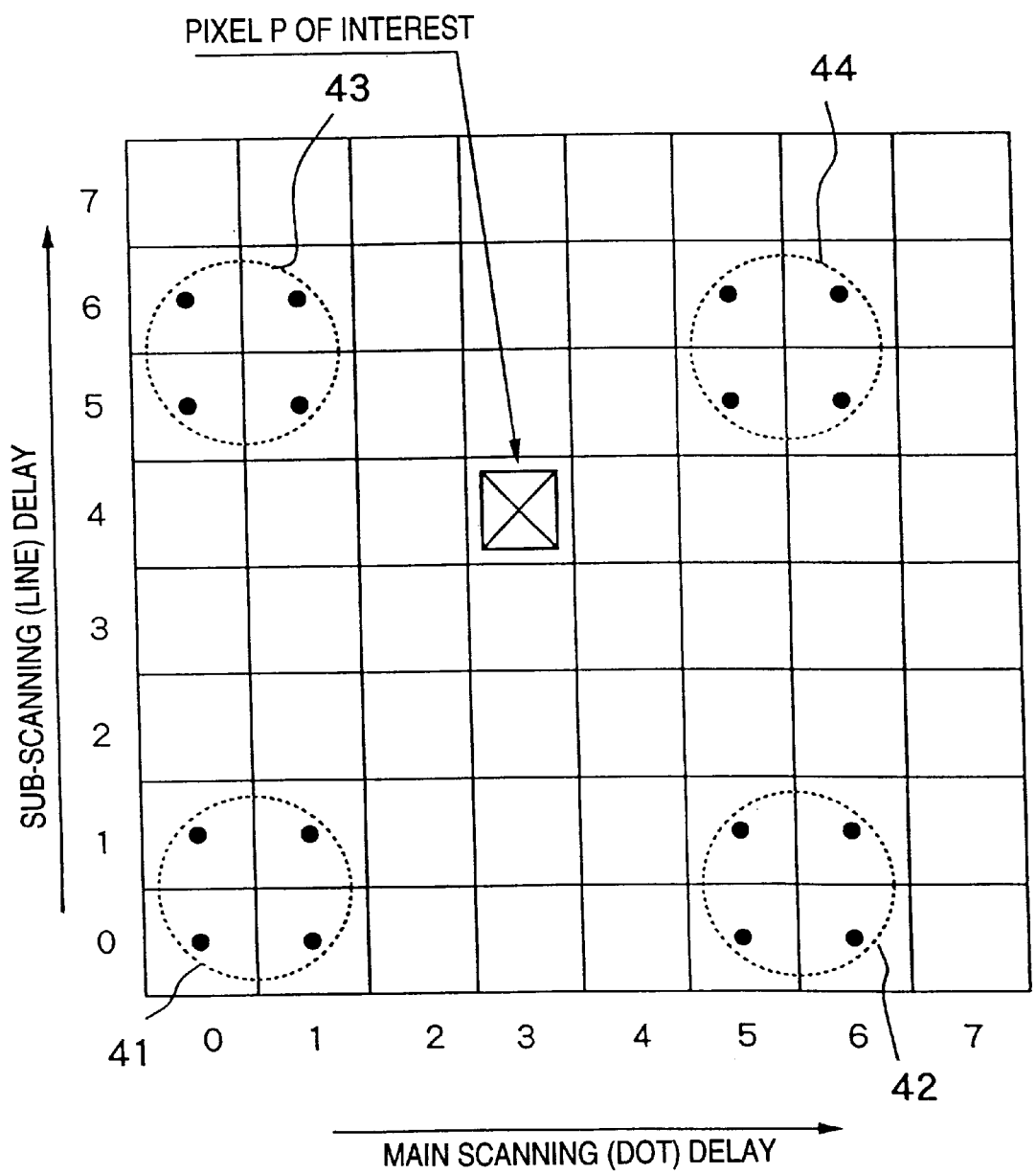
FIG. 7 is a view showing the evaluation template used for performing image frame processing evaluation in the first embodiment.

The image frame cannot be added to the upper and lower sides of the original by only evaluation in the main scanning lines. Therefore, in this embodiment, an image frame processing evaluation template shown in FIG. 7 is generated using a FIFO (first-in, first-out) memory, thereby adding the image frame not only on the right and left sides but also on the upper and lower sides. Referring to FIG. 7, four pixels with ● marks, which are arranged at each of four corners around the position of a pixel P of interest (currently output pixel) serve as one evaluation point. More specifically, four evaluation points 41, 42, 43, and 44 are present with respect to the pixel P of interest. When all the four pixels of each evaluation point are white (or black) pixels, an evaluation value "white" (or "black") is assigned to the point.

When the image frame addition processing is performed using this evaluation template, if an evaluation value "white" is assigned to one of the four evaluation points 41 to 44, the effective pixel period signal for the pixel P of interest is enabled; if evaluation values "black" are assigned to all the four evaluation points 41 to 44, the effective pixel period signal is disabled. With this control, a black frame which has 2-dot wide upper and lower sides and 3-dot wide right and left sides is left as an image frame.

On the other hand, when image frame omission processing is performed, if evaluation values "white" are assigned to all the four evaluation points 41 to 44, the effective pixel period signal for the pixel of interest is enabled; when an evaluation value "black" is assigned to one of the four evaluation points 41 to 44, the effective pixel period signal is disabled. With this control, a range obtained by excluding upper and lower 2-dot wide portions and right and left 3-dot wide portions from the original image becomes an effective pixel period. Consequently, the black background around the original image is completely erased (converted into white).

The operation in the image processing unit 400 shown in FIG. 5 will be described in detail below.

A 16-bit counter 501 is cleared by a horizontal (line) synchronization pulse ($\overline{\text{HSYNC}}$) as the start pulse for one main scanning line of the original image. On the other hand, since the counter 501 receives pixel clocks (CLK) as clock inputs, it indicates the current data position in one line by always incrementing its count output value.

The output from an SR latch 502 as a latch circuit changes to "0" in response to a black dot group sense signal ($\overline{\text{SNSBK}}$), and changes to "1" in response to a white dot group sense signal ($\overline{\text{SNSWT}}$).

Note that the black dot group sense signal is a signal indicating that an evaluation value "black" is obtained in the evaluation template shown in FIG. 7. When the image frame addition processing is performed (A), the black dot group sense signal is enabled when all the evaluation points 41 to 44 are evaluated as "black". On the other hand, when the image frame omission processing is performed (B), the black dot group sense signal is enabled when one of the evaluation points 41 to 44 is evaluated as "black".

Likewise, the white dot group sense signal is a signal indicating that an evaluation value "white" is obtained in the evaluation template. When the image frame addition processing is performed (A), the white dot group sense signal is enabled when one of the evaluation points 41 to 44 is evaluated as "white". On the other hand, when the image frame omission processing is performed (B), the white dot group sense signal is enabled when all the evaluation points 41 to 44 are evaluated as "white".

In this embodiment, whether or not the image frame addition processing is performed, i.e., selection between the above-mentioned cases (A) and (B) may be designated by the operation unit 930 on the scanner 800. Alternatively, the host computer 600 side that actually receives an image added with the image frame may issue an instruction, and the instruction may be received by the scanner 800 via the interface to make a decision.

The output from the SR latch 502 is re-synchronized with the pixel clocks (CLK) by a D-FF 503 as a D-type flip-flop circuit, and is input to the latch enable (LE) terminal of a 16-bit latch 504. On the other hand, since the sampling data ([D]) terminal of the 16-bit latch 504 receives the current data position value, which is always incremented, from the 16-bit counter 501, the output of the latch 504 stores the count value (16 bits) of the final white position of the current line.

Furthermore, since the latch enable (LE) terminal of a 16-bit latch 505 on the output side of the latch 504 receives a horizontal (line) synchronization pulse (HSYNC) of positive logic, the output ([Q]) terminal of the 16-bit latch 505 stores the count value of the final white position of the previous line at the beginning of the next line.

In the next line, upon outputting the first white dot group sense signal ($\overline{\text{SNSWT}}$), a 1-line start delay output signal generated by an SR latch 507 and a D-FF 508 is already set in the enable state (0 level) during the previous line. Hence, an effective pixel period start signal ($\overline{\text{IDOPN}}$) is enabled, and the output from an SR latch 509 is set in the enable state (0 level) by the above-mentioned first white dot group sense signal ($\overline{\text{SNSWT}}$).

On the other hand, one input terminal ([Q]) of a 16-bit comparator 506 receives the current data position which is always incremented, and the other input terminal [P] of the comparator 506 receives the count value of the final white position of the previous line. Therefore, when the current data position is incremented and matches the count value of the final white position, a 0-level signal, i.e., a coincidence output ($\overline{\text{P=Q}}$) of the comparator 506 is output as a signal ($\overline{\text{IDCLS}}$) indicating the end of the effective pixel period.

In response to this signal, the output of the SR latch 509 returns to the disable state (1 level). More specifically, the output of the SR latch 509 changes to the enable state (0 level) in response to the first white dot group sense signal of the line of interest, and returns to the disable state (1 level) when the final white dot group sense position of the previous line has been reached. Therefore, the outputs of the SR latch 509 constitute effective pixel period signals in the image frame processing in one scanning line.

A filter gate 510 calculates the AND of negative logic between each effective pixel period signal and the pixel data (CURID) of interest to generate effective pixel data, thus realizing the above-mentioned image frame processing.

Figure 8:
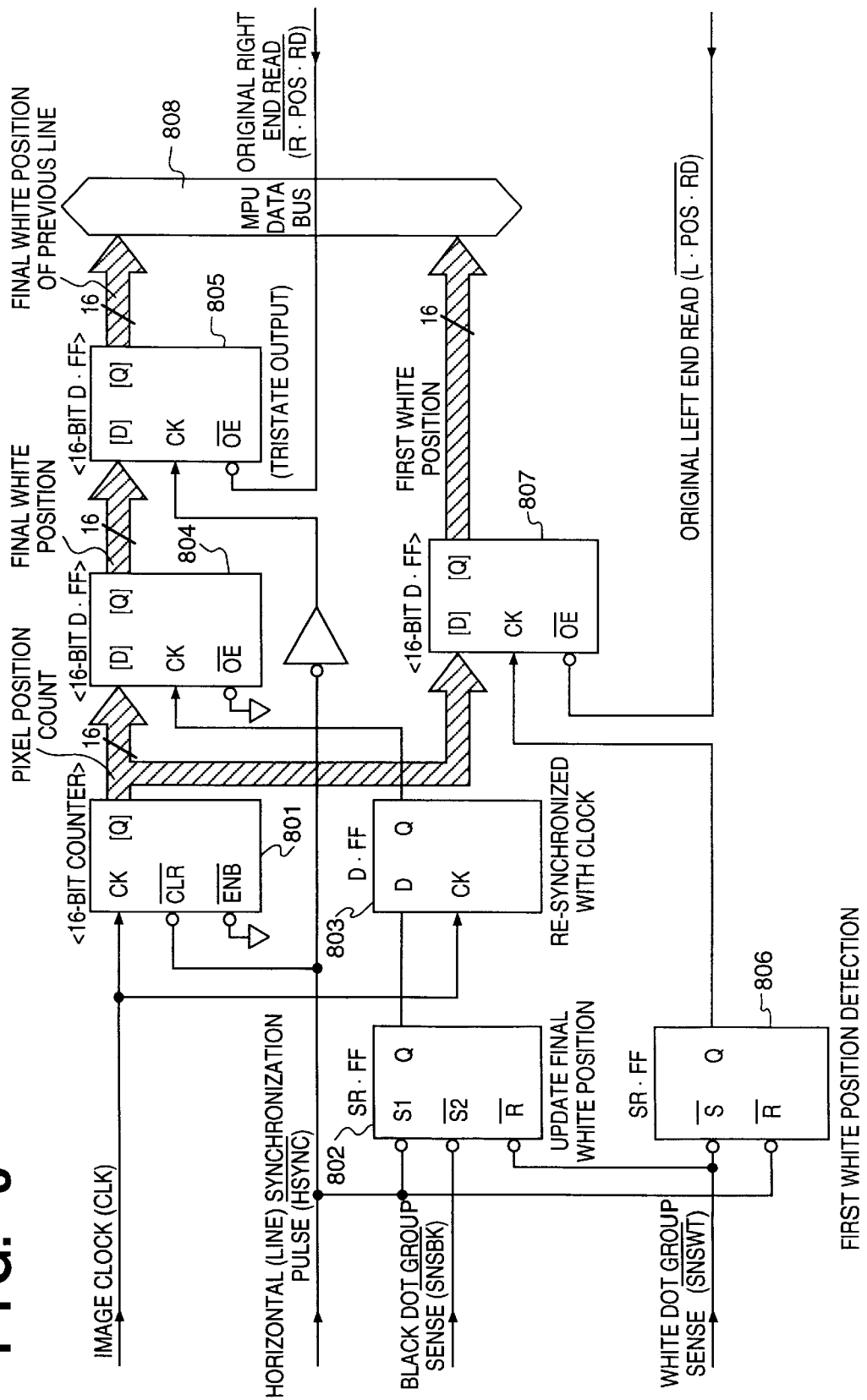
FIG. 8 is a circuit diagram showing the arrangement of an image outer shape detection unit in the first embodiment.

FIG. 8 shows in detail the circuit arrangement of the original image outer shape detection unit 300, and the arrangement of the unit 300 will be described below.

The detection processing in the original image outer shape detection unit 300 shown in FIG. 8 will be briefly described below. The original image outer shape detection unit 300 updates the first white pixel detection position (corresponding to the left end of the original image) and the final white pixel detection position (corresponding to the right end of the original image) in units of main scanning lines, and the MPU 900 continuously reads out the updated positions at appropriate timings, thereby detecting the shape of the original image. During this process, if it is determined that the original image does not have a rectangular shape, the irregular shape detection signal 310 is output to the exceptional processing unit 700, thus performing required exceptional processing.

The operation in the original image outer shape detection unit 300 shown in FIG. 8 will be described in detail below.

A 16-bit counter 801, an SR flip-flop (SR-FF) 802, a D flip-flop (D-FF) 803, a 16-bit D-FF 804, and a 16-bit D-FF 805 store the final white pixel position of the previous line as in the components 501 to 505 in FIG. 5 described above. An SR-FF 806 is reset by the horizontal (line) synchronization pulse ($\overline{\text{HSYNC}}$) at the beginning of the line, and its output changes to "0". On the other hand, the SR-FF 806 is set by the first white dot group sense signal ($\overline{\text{SNSWT}}$) and its output changes to "1". That is, the SR-FF 806 generates a pulse signal that rises at the first white position.

The sampling data ([D]) terminal of a 16-bit D-FF 807 receives the current data position value which is incremented in units of pixels by the 16-bit counter 801, and its clock (CK) terminal receives the above-mentioned pulse signal that rises at the white position. Therefore, the output of the D-FF 807 stores the first white pixel position of the current line. The MPU 900 can read out these right and left position information values via an MPU data bus 808 as a memory mapped input port.

In this embodiment, the above-mentioned means can detect the original image outer shape. It must then be checked if the detected original image outer shape is an irregular shape. This process is realized by software and various algorithms may be used. Of such methods, as a method that can be relatively easily realized, the right and left boundary positions between the original image read by the above-mentioned circuit and the background portion are sampled at appropriate line intervals, and when the moving amounts of the boundary positions from the immediately preceding sampling timing are larger than a predetermined value, it is determined that the target original image has an irregular shape (does not have a rectangular shape), and the exceptional processing is performed.

An algorithm of determining that the outer shape detected, as shown in FIG. 4D, is an irregular shape will be described below with reference to FIG. 9.

Figure 9:
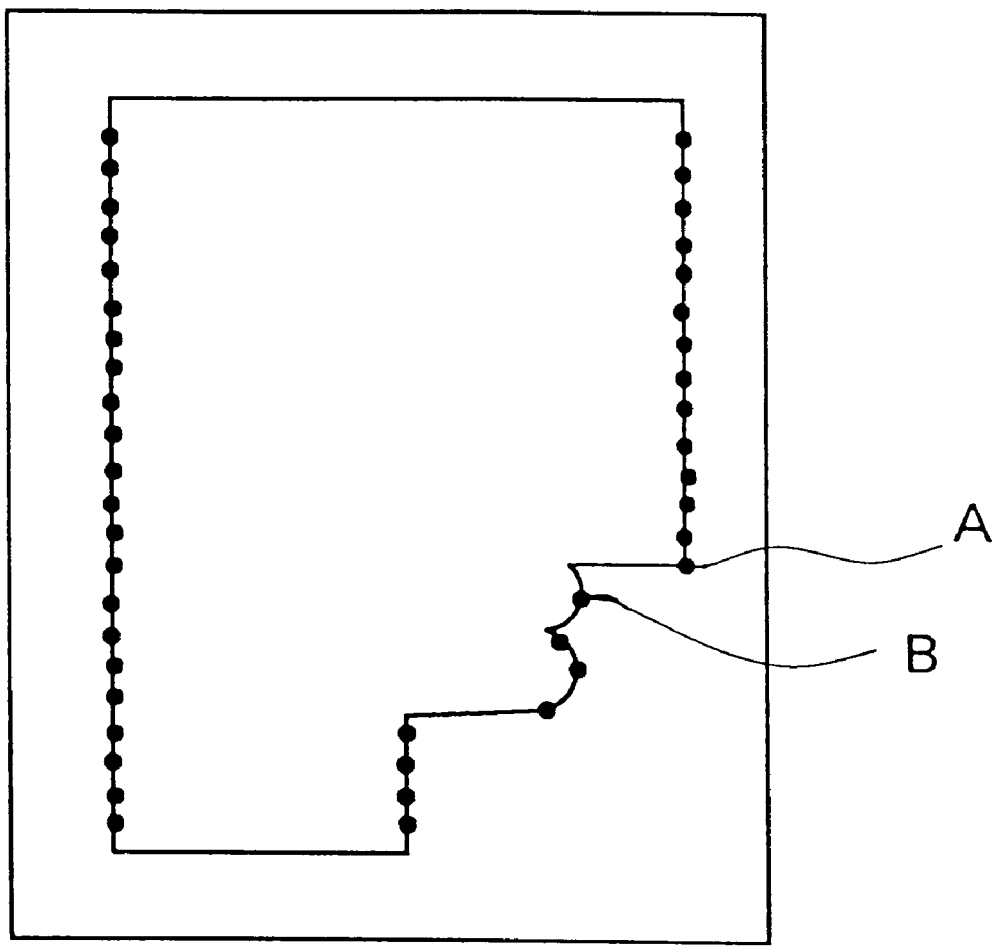
FIG. 9 is a view showing an example upon detecting an irregular shape in the first embodiment.

Referring to FIG. 9, points illustrated on the right and left sides of the original image indicate the timing positions where the boundary points between the original image and the background are sampled. At each sampling point, if the distance from the sampling point at the immediately preceding timing that belongs to the same side is larger than a pre-set distance, it is determined at that time that the outer shape of this original is not rectangular. In FIG. 9, for example, since the distance between sampling points A and B is larger than a distance designated in advance, it is determined that the original image shape is not a rectangular shape but an irregular shape.

The MPU 900 reads the white pixel positions at the right and left ends of the original latched by the D-FFs 805 and 807 via the MPU bus 808, and compares the read positions with the previously read right and left white pixel positions, thereby determining whether or not the original image shape is an irregular shape.

Figure 15:
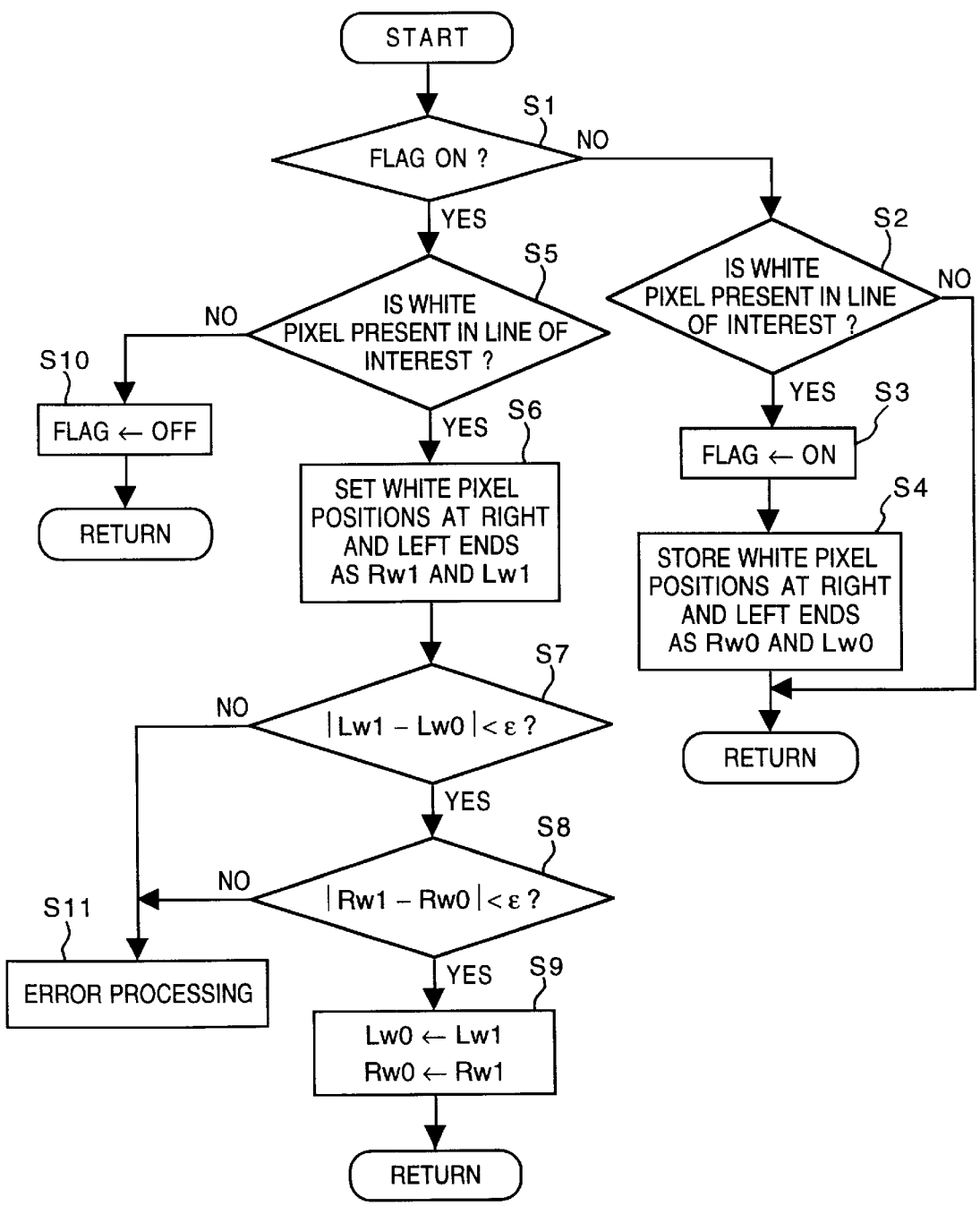
FIG. 15 is a flow chart showing some steps of the processing of an MPU 900 in the first to third embodiments.

An example of the processing of the MPU 900 will be described in detail below with reference to FIG. 15. Note that the flow chart in FIG. 15 shows interrupt processing executed upon receiving an HSYNC signal generated by the original image reading unit 100 every time the unit 100 reads an image for one main scanning line. The program corresponding to the flow chart is stored in the ROM 910, and a flag to be described below is reset to "OFF" before beginning of reading of one original. The meaning of the state of the flag will become apparent from the following description. Normally, the flag changes to the ON state during reading an original image, and changes to the OFF state before reaching the upper side of the original and after exceeding the lower side of the original.

Upon reception of the HSYNC signal, it is checked in step S1 if the flag is ON. In the initial state, since the flag is OFF, the flow advances to step S2 to check if data indicating white pixels at the right and left ends are present in the line of interest (the line read immediately before this processing according to the arrangement shown in FIG. 8). This checking step can be attained by checking if data latched by both the D-FF 805 and the D-FF 807 are "0" or the data have an equal value.

If it is determined in step S2 that no white pixels are present, it is determined that the upper side of the original has not been reached yet, and this interrupt processing ends.

When the upper side of the original is read, it is determined in step S2 that white pixels are present, and the flow advances to step S3 to set the flag ON. In step S4, the read white pixel positions at the right and left ends are stored in a predetermined area of the RAM 920 as Rw0 and Lw0, thus ending this processing.

As a consequence, upon completion of reading the next one line, YES is determined in step S1, and the flow advances to step S5 to check if white pixels are present in the line of interest. If it is determined in step S5 that white pixels are present, it indicates that the "original" is being read, and the flow advances to step S6 to set the white pixel positions at the right and left ends read out from the D-FF 805 and the D-FF 807 to be Rw1 and Lw1. The flow then advances to step S7 to check if the absolute value of the difference between Lw0 stored in the RAM 920 and the currently input Lw1 is smaller than a predetermined value $\epsilon$. It is also checked in step S8 if the absolute value of the difference between Rw0 and Rw1 is smaller than $\epsilon$.

If these two conditions are both satisfied, the white pixel positions at the right and left ends of the original have not substantially changed, and the currently read values Rw1 and Lw1 are written in the RAM 920 to update Rw0 and Lw0 with these values in step S9.

In this manner, while the original is being read, the flag is kept ON, and when a normal original is read, the absence of white pixels is detected soon. More specifically, a portion below the lower end of the original is read. In this case, since NO is determined in step S5, the flow advances to step S10 to reset the flat to "OFF".

When it is determined the white pixel positions Rw1 and Lw1 at the right and left ends of the original obtained during the ON state of the flag are separated from those in the immediately preceding main scanning line by an appropriate distance ($\epsilon$ in FIG. 15) or more (i.e., NO is determined in step S7 or S8), the flow advances to step S11 to determine that the currently read original has an irregular shape, thus executing error processing.

As described above, according to this embodiment, an original image for which appropriate image frame addition processing cannot be performed, e.g., an original having a halftone foundation, or the like is discriminated, thus avoiding inappropriate image frame addition.

In the description of this embodiment, the image frame processing unit 400 and the original image outer shape detection unit 300 are independently arranged for the sake of descriptive convenience. However, since these units have many common arrangements, they are constituted as a single circuit block in practice to attain higher efficiency.

<Second Embodiment>

The second embodiment according to the present invention will be described below.

Figure 10:
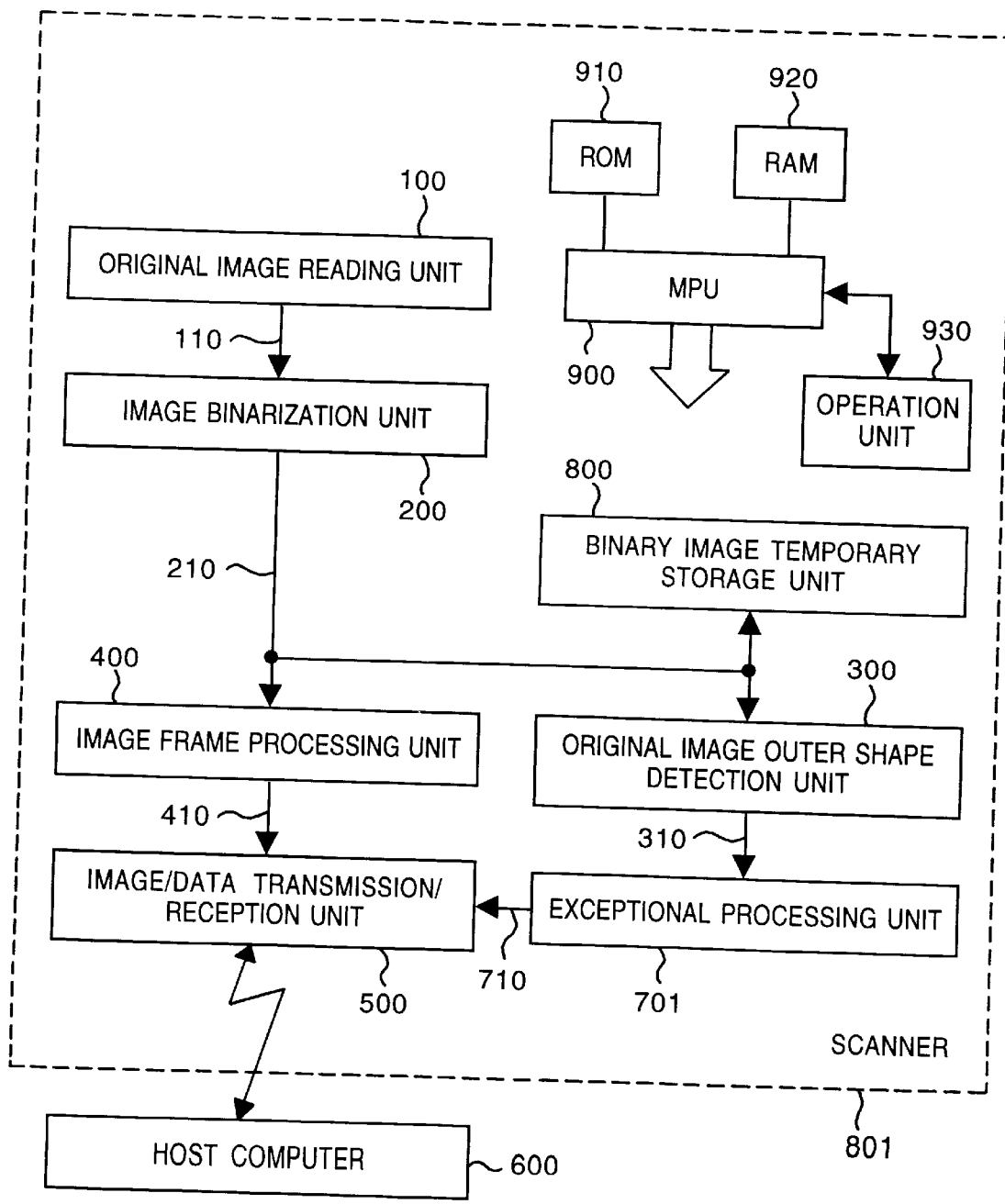
FIG. 10 is a block diagram showing the basic arrangement of a scanner according to the second embodiment of the present invention.

FIG. 10 shows the basic block arrangement of a scanner 801 of the second embodiment. The same reference numerals in FIG. 10 denote constituting elements that implement the same functions as those in FIG. 1, and a detailed description thereof will be omitted.

The arrangement shown in FIG. 10 is characterized in that a binary image temporary storage unit 800 is added to the arrangement shown in FIG. 1. Although the flow of the overall operation in the second embodiment is substantially the same as that in the first embodiment, the second embodiment is characterized in that image data 210 binarized by an image binarization unit 200 is temporarily stored in the binary image temporary storage unit 800 parallel to the operation for sequentially transmitting the image data 210 subjected to the image frame processing to a host computer 600.

Note that the binary image temporary storage unit 800 may commonly use a video RAM of, e.g., a display independently arranged on the scanner 801 to monitor-display the read image.

Since the above-mentioned constituting element is added, the second embodiment further allows the following exceptional processing operations (4) to (6) in addition to items (1) to (3) described in the first embodiment as exceptional processing to be performed by an exceptional processing means 701.

(4) Binary image data temporarily stored in the binary image temporary storage unit 800 is directly re-transmitted to the host computer 600. That is, an image which is not subjected to the image frame processing is transmitted.

(5) The MPU 900 performs image frame processing for binary image data temporarily stored in the binary image temporary storage unit 800 by software, and re-transmits the processed data to the host computer 600. Although the processing time is prolonged, an image which is reliably subjected to the image frame addition processing can be transmitted. Note that the processing program for implementing the software processing is held in a ROM 910.

(6) The image frame processing function is canceled as needed, and a message indicating that image data which is not subjected to the image frame processing is transmitted is supplied to the host computer 600.

As described above, according to the second embodiment, since a binary image is temporarily stored, the exceptional processing can be performed more effectively even when appropriate image frame processing cannot be performed. For example, as the exceptional processing, a binary image, an image to which an image frame is added by software, and the like can be transmitted to the host computer.

The exceptional processing operations (4) to (6) to be executed upon determining an irregular shape are selected according to the condition set via an operation unit 930. In some cases, the host computer may set the operations to be executed when it issues an original reading instruction to the scanner.

In any case, the processing upon determining an irregular shape is executed in the error processing (step S11) in the flow chart shown in FIG. 15. For example, if it is set to execute the processing (4) upon determining an irregular shape, the MPU 900 reads out binary image data stored in the binary image temporary storage unit 800, and transfers it to the host computer via an image/data transmission/reception unit 500.

Note that the host computer to which the scanner of the second embodiment is connected must perform the corresponding processing, as described above.

Figure 16:
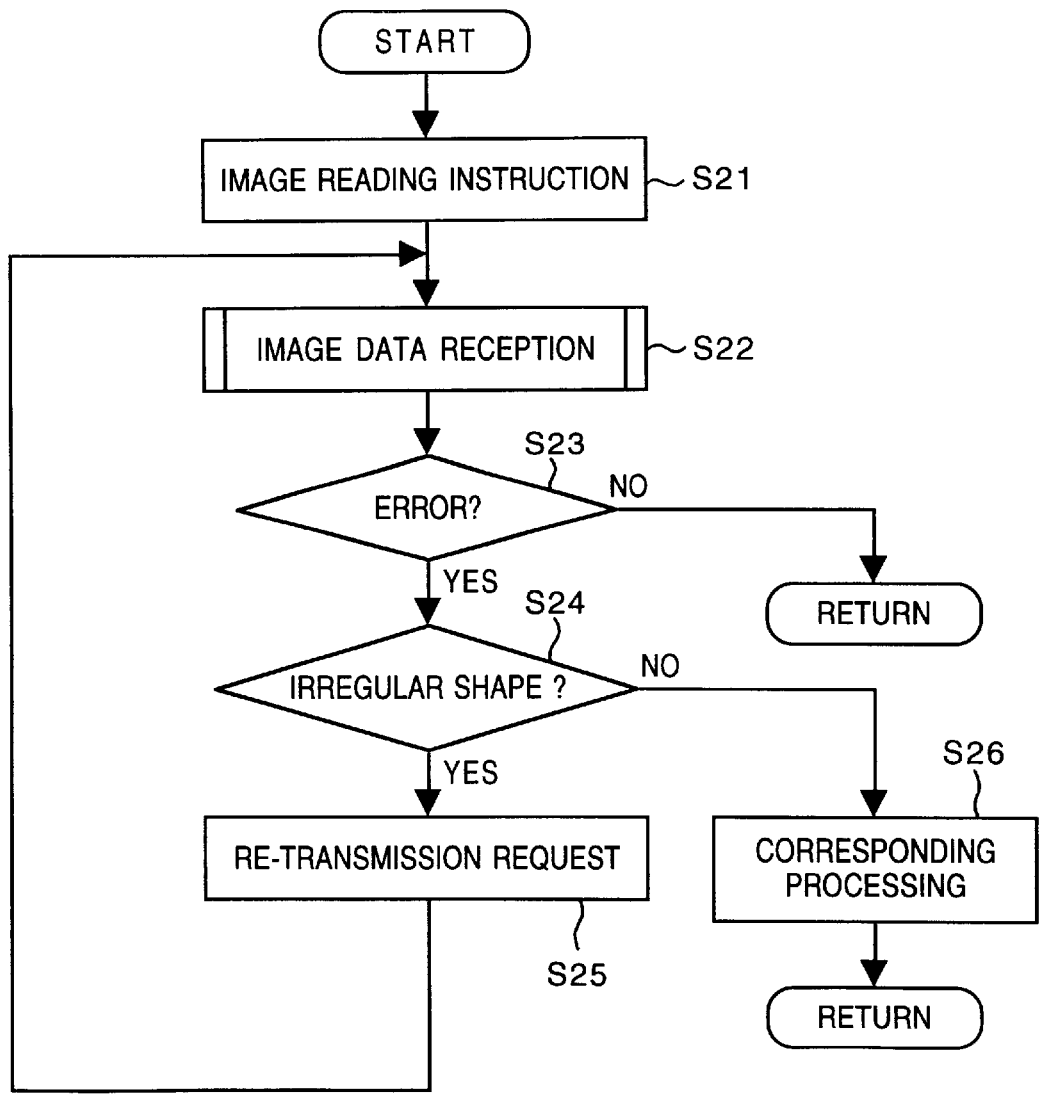
FIG. 16 is a flow chart showing the processing contents of a scanner driver that runs on a host computer in the second embodiment.

For example, when the processing (4) is to be executed, a driver software program for an image scanner that runs on the host computer processes a reading instruction received from an application program running on the host computer in, e.g., the procedure shown in FIG. 16.

An image reading instruction is issued in step S21, and transferred image data is received in step S22. Upon receiving the data, if it is determined that the image data is normally received (step S23), the received image data is transferred to the application program that called this processing, thus ending the processing. On the other hand, if it is determined that an error message is received, the flow advances to step S24 to check if the error message is generated as a result of determining an irregular shape. If the error message is generated due to a cause other than determining an irregular shape (e.g., jam during original feeding), the flow advances to step S26 to execute the corresponding error processing.

On the other hand, if the error message is generated owing to determining an irregular shape, a re-transmission instruction is issued, and the flow returns to step S2 to receive re-transmitted image data.

At this time, if the scanner side is instructed to directly transfer binary image data stored in the binary image temporary storage unit 800 as the processing upon determining the irregular shape, the binarized data of the original image, i.e., image data which is not subjected to the image frame processing, is directly transferred.

Note that the host computer displays, on its screen, a message indicating that the image frame processing has failed and a binary image which is not subjected to the image frame processing is being transferred, thereby avoiding confusion on the side of the user.

<Third Embodiment>

The third embodiment according to the present invention will be described below.

In the first embodiment described above, for example, when an original image outer shape detection unit 320 detects the outer shape of an original image, a function of determining that the original image shape is an irregular shape (not a rectangular shape) may be added when the moving amounts, per unit sub-scanning movement of the original image, of the right and left boundary positions between the original image and the background portion in the main scanning direction are larger than a predetermined amount (m) (i.e., the skew amount of the original image is large). With this function, the outer shape can be detected more finely.

Figure 11:
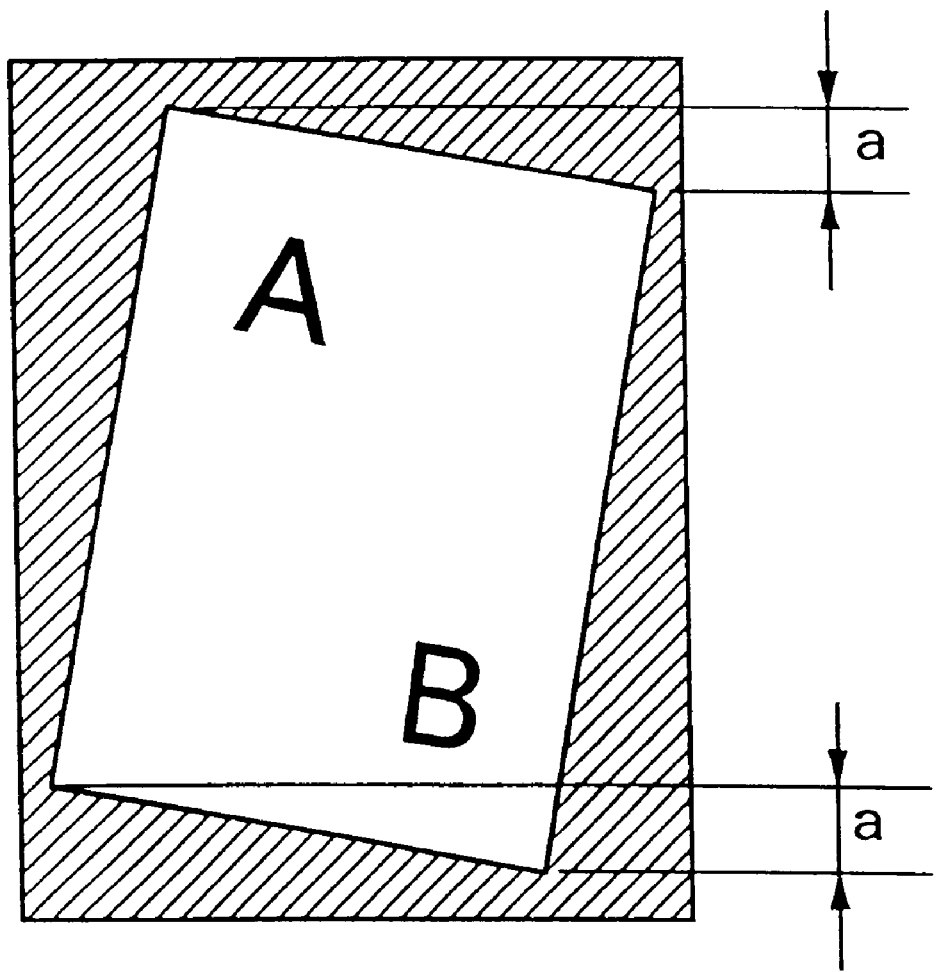
FIG. 11 is a view showing a skewed original which is obliquely fed.

A case will be examined below wherein an original is fed while being obliquely set on the original table, i.e., the original skews, and reading is performed in this state, as shown in FIG. 11. In this case, by adjusting the predetermined amount m, a slightly skewed original can be subjected to normal shape detection. However, especially in the leading and trailing regions indicated by a in FIG. 11, it is determined that the moving amounts of the right and left boundary positions between the original image and the background portion are considerably large, i.e., the original image skews considerably. Therefore, it is determined that this original has an irregular shape. In this case, when the original is obliquely set even slightly, accurate outer shape detection is disturbed.

Therefore, as for the upper and lower side portions on the leading and trailing ends of the original where the skew amount becomes considerably large, the above-mentioned discrimination processing may be inhibited. For this purpose, in order to execute the processing while ignoring the upper and lower side portions, a method of increasing the sampling interval for discrimination and/or a method of determining an irregular shape when boundary positions with large moving amounts successively appear a predetermined number of times or more may be used. However, such methods deteriorate the irregular shape detection performance.

The third embodiment has as its object to solve the above-mentioned problems.

Figure 12:
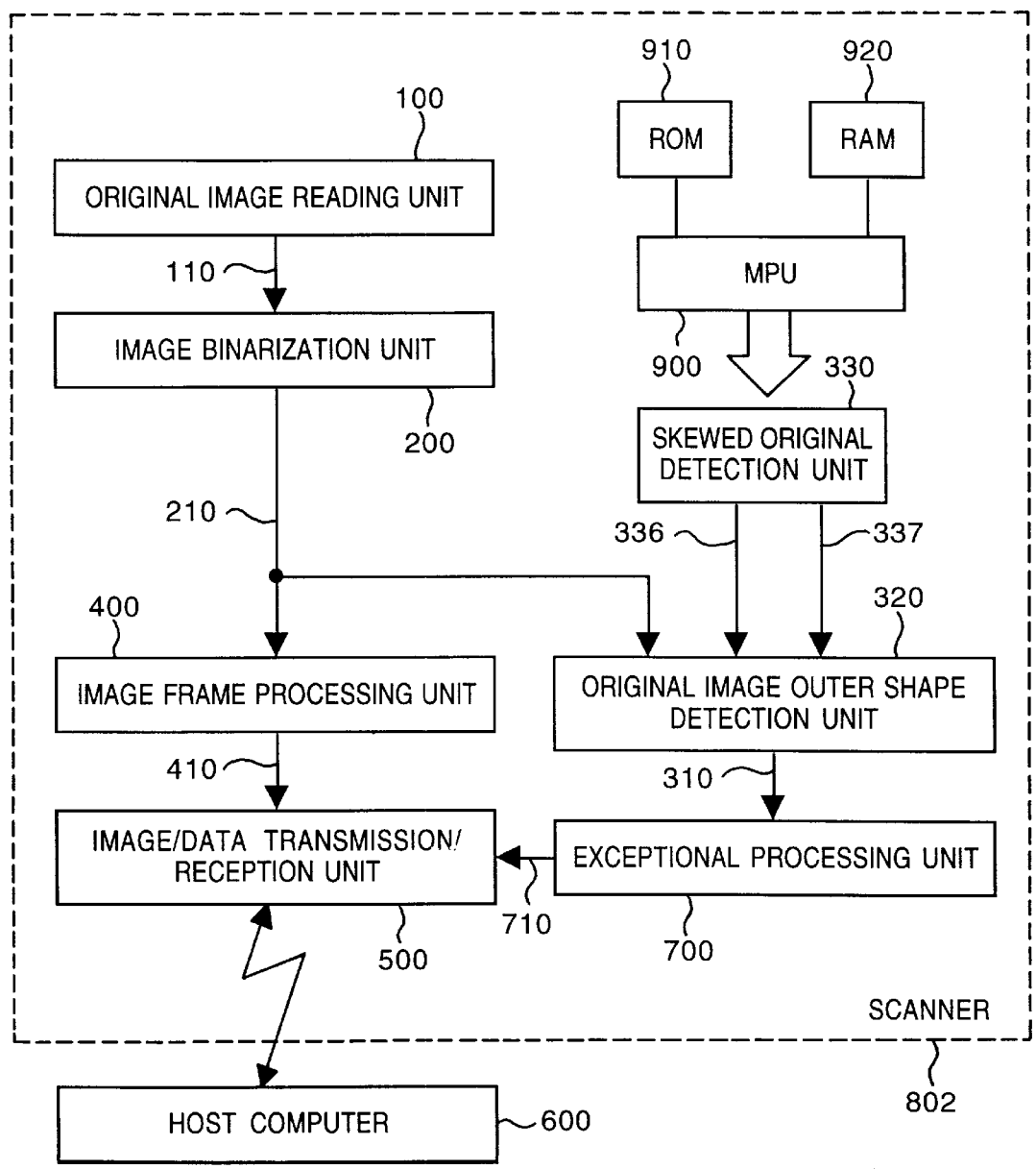
FIG. 12 is a block diagram showing the basic arrangement of a scanner according to the third embodiment of the present invention.

FIG. 12 shows the basic block arrangement of a scanner 802 of the third embodiment. The same reference numerals in FIG. 12 denote constituting elements that realize the same functions as those in FIG. 1, and a detailed description thereof will be omitted.

The arrangement shown in FIG. 12 is characterized by comprising a skewed original detection unit 330. That is, the third embodiment is characterized in that the outer shape detection processing in an original image outer shape detection unit 320 is controlled in accordance with an outer shape detection start signal 336 and an outer shape detection end signal 337 output from the skewed original detection unit 330.

Figure 13:
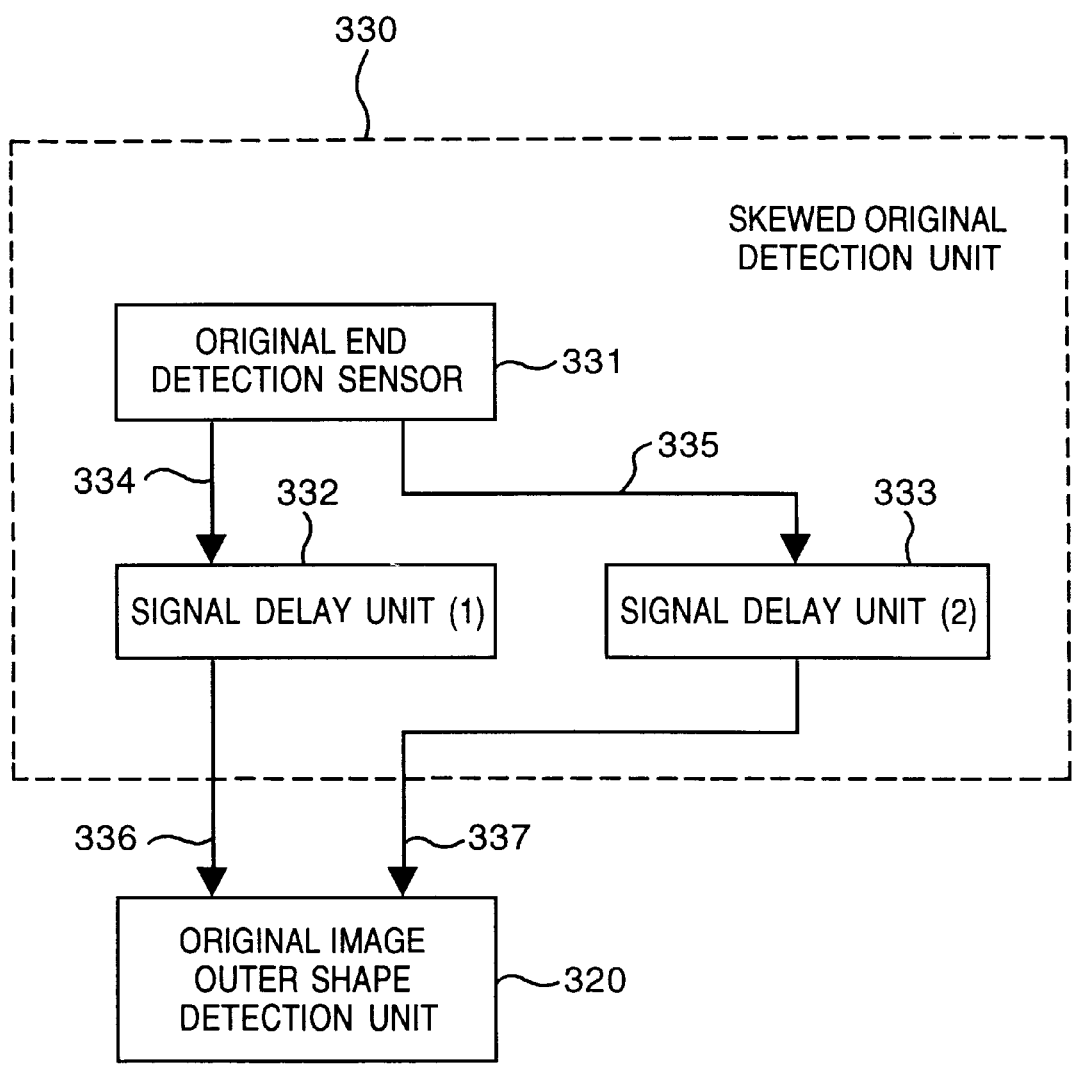
FIG. 13 is a block diagram showing in detail the arrangement of a skewed original detection unit in the third embodiment.

FIG. 13 shows the detailed block arrangement of the skewed original detection unit 330, and the arrangement of the unit 330 will be described below.

Figure 14:
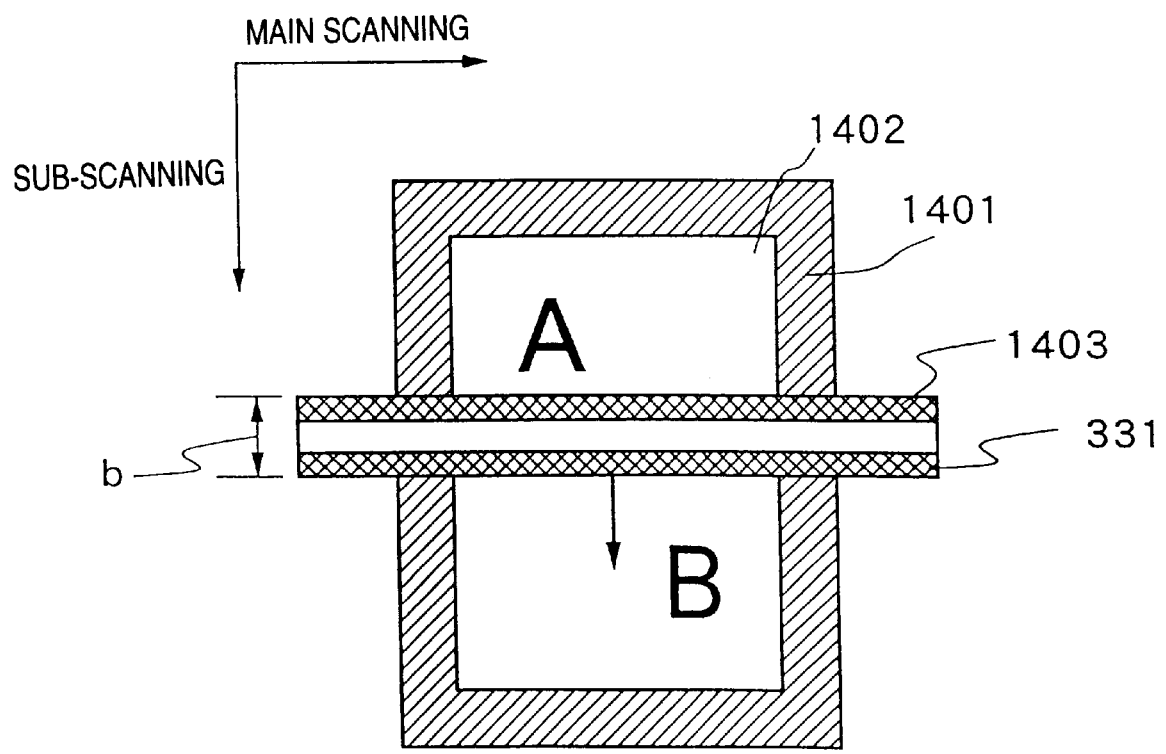
FIG. 14 is a view showing the layout position of an original end detection sensor in the third embodiment.

Referring to FIG. 13, reference numeral. 331 denotes an original end detection sensor. FIG. 14 shows the layout position of the original end detection sensor 331. FIG. 14 shows the schematic arrangement of the original table of the scanner 802. An original 1402 is set on an original table 1401, and when a reading sensor 1403 such as a CCD moves above the original table 1401 in the sub-scanning direction, light reflected by the original 1402 and the original 1401 is read as an image signal. The original end detection sensor 331 is set at a position ahead by a distance b of the reading sensor 1403 in the sub-scanning direction, and moves together with the reading sensor 1403.

The original end detection sensor 331 with the above layout outputs an original leading end detection signal 334 indicating that the leading end position of the original 1402 is detected, and an original trailing end detection signal 335 indicating that the trailing end position of the original 1402 is detected. A signal delay unit 332 receives the original leading end detection signal 334, delays it by b+x as a distance, and outputs an outer shape detection start signal 336. Note that x is a predetermined distance.

On the other hand, a signal delay unit 333 receives the original trailing end detection signal 335, delays it by b−x as a distance, and outputs an outer shape detection end signal 337.

The outer shape detection start signal 336 and the outer shape detection end signal 337 output from the skewed original detection unit 330 are input to the original image outer shape detection unit 320.

In this manner, the skewed original detection unit 330 can mask portions from the upper and lower sides of the original in the image reading operation in correspondence with the predetermined sub-scanning distance x in the signal delay units 332 and 333, i.e., can control to inhibit irregular shape discrimination in these portions.

For example, in the above-mentioned example of the skewed original shown in FIG. 11, when a is set to be the predetermined distance x, the irregular shape discrimination processing for the ranges indicated by a can be masked. Accordingly, discrimination errors of the irregular shape in the outer shape discrimination can be prevented, thus improving reliability.

Note that the arrangement of the scanner 802 shown in FIG. 12 in the third embodiment may comprise a storage unit for temporarily storing a binary image as in the second embodiment described above. With this arrangement, the exceptional processing operations described in the second embodiment can be further added.

As described above, according to the first to third embodiments, when the image frame processing is to be performed for an original image read by the scanner, an original image that cannot be subjected to appropriate image frame addition processing, such as an original having a halftone foundation or the like can be discriminated, and the image frame can be prevented from inappropriately added. Therefore, when an image added with an image frame is transmitted to, e.g., the host computer via a communication line, a strange image formed due to addition of an inappropriate image frame can be prevented from being formed, thus reducing unwanted transmission cost.

Furthermore, when an image before addition of an image frame is temporarily stored, the exceptional processing can be performed more effectively even when appropriate image frame processing cannot be performed. For example, as the exceptional processing, an image before an image frame is added, an image to which an image frame is added by software processing, and the like can be transmitted to the host computer or the like.

Furthermore, even when an original is obliquely set in the original reading operation, original image shape detection free from any operation errors can be realized by a simple algorithm.

<Fourth Embodiment>

In the first to third embodiments, the scanner connected to the host computer has been described. The fourth embodiment will exemplify a case wherein a scanner unit, a display unit, and a printer unit are integrated in a single apparatus.

Figure 17:
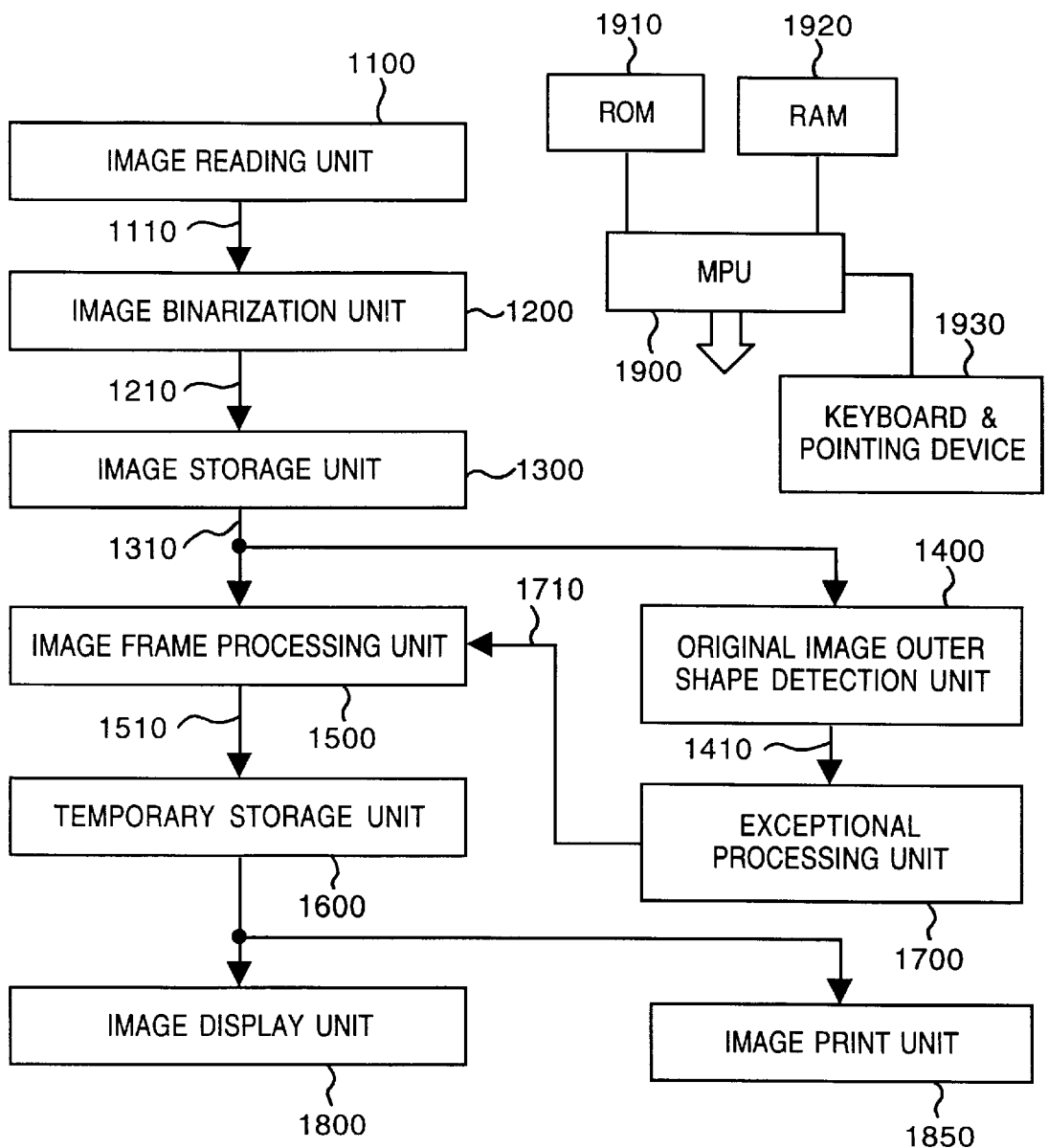
FIG. 17 is a block diagram showing the arrangement of a system according to the fourth embodiment of the present invention.

FIG. 17 shows the basic block arrangement of an image processing apparatus according to the fourth embodiment. Referring to FIG. 17, reference numeral 1100 denotes an original image reading unit for reading an original image as an object together with the background with a color different from the foundation color of an original; and 1200, an image binarization unit for converting image information 1110 read by the original image reading unit 1100 into pixel signals of two, i.e., black and white levels, using a digital comparator or the like. Reference numeral 1300 denotes an image storage unit for encoding and storing image information 1210 binarized by the image binarization unit 1200 on an appropriate recording medium such as a magnetooptical disk. Reference numeral 1400 denotes an original image outer shape detection unit for detecting the outer shape of a reproduced original image 1310 by using the reproduced image signal 1310 decoded and read out from the image storage unit 1300 and by utilizing the fact that the foundation color (white) in the original is different from the background color (black) outside the original. When the detected outer shape is an irregular shape, the unit 1400 outputs an irregular shape detection signal 1410 to an exceptional processing unit 1700. Reference numeral 1500 denotes an image frame processing unit for performing image frame processing for adding or erasing an image frame to or from the reproduced image signal 1310 by high-speed sequential processing by similarly utilizing the different background colors of the reproduced image signal 1310. Reference numeral 1600 denotes a temporary storage unit comprising, e.g., a semiconductor memory element for temporarily storing at least one original image (for one frame) subjected to the image frame processing; and 1700, an exceptional processing unit. When the original image outer shape detection unit 1400 determines that the outer shape of the currently processed image (target original image) is an irregular shape, the exceptional processing unit 1700 operates upon reception of the irregular shape detection signal 1410.

Reference numeral 1800 denotes an image display unit which comprises a CRT, a liquid crystal display, or the like for monitor-displaying the original image stored in the temporary storage unit 1600; and 1850, an image print unit which comprises, e.g., an LBP (laser beam printer) or the like for printing out the stored original image onto a recording paper sheet.

Reference numeral 1900 denotes an MPU for systematically controlling the respective units of the apparatus of this embodiment in accordance with a control program stored in a ROM 1910. Reference numeral 1920 denotes a RAM which is used as the work area of the MPU 1900. Reference numeral 1930 denotes a keyboard & pointing device.

In the above-mentioned arrangement, the image reading unit 1100 and the image binarization unit 1200 need not always be integrated as the constituting elements of the apparatus of this embodiment. For example, a combination of the image reading unit 1100, the image binarization unit 1200, and the image storage unit 1300 may be separated as an independent image recording device.

The image processing apparatus of this embodiment has the above-mentioned arrangement and the flow of image data. This embodiment is especially characterized by the original image outer shape detection unit 1400. Since the original image outer shape detection unit 1400 detects whether or not the shape of the original which is being processed is an irregular shape, it can be used for the purpose of rejecting such original image. However, this embodiment is characterized in that the original image outer shape detection unit 1400 makes discrimination for the purpose of detecting operation errors of the image frame processing unit 1500.

In the above arrangement, the image frame processing unit 1500 has the same arrangement as that of the image frame processing unit 400 described in the first embodiment, and the original image outer shape detection unit 1400 also has the same arrangement as that of the original image outer shape detection unit 300 in the first embodiment. More specifically, the image frame processing unit 1500 has the arrangement shown in FIG. 5, and the original image outer shape detection unit 1400 has the arrangement shown in FIG. 8. The operations of these units are as has been described in the first embodiment, and a detailed description thereof will be omitted.

In the above arrangement, when an original is set on the image reading unit 1100, and an image on the original surface is read by feeding the original using an auto feeder (not shown), the read image is binarized by the image binarization unit 1200, and the binary image is temporarily stored in the image storage unit 1300.

The original image outer shape detection unit 1400 discriminates by the same operation as in the first embodiment whether or not the read original image has an irregular shape. More specifically, when the unit 1400 detects an edge pattern, as shown in FIG. 4D, it determines an irregular shape. If an irregular shape is determined, the unit 1400 activates the irregular shape detection signal 1410 to trigger the exceptional processing unit 1700.

When the exceptional processing unit 1700 is triggered by the irregular shape detection signal 1410 from the original image outer shape detection unit 1400, it suspends the reproduction processing of an original image which is being read out from the image storage unit 300, and outputs a cancel command to the image frame processing unit 1500, thereby canceling the image frame addition or erasing processing function in the image frame processing unit 1500. At this time, image data that has already been subjected to the image frame processing and temporarily stored in the temporary storage unit 1600 is abandoned. An original image stored in the image storage unit 1300 is read out and reproduced again, and is temporarily stored in the temporary storage unit 1600 without being subjected to any processing in the image frame processing unit 1500. Thereafter, the original image is displayed or printed out. With this processing, an odd-looking image formed owing to operation errors of the image frame processing unit 1500 can be prevented from being displayed or printed out.

When the image frame processing is not performed, an area from which the original image is read out again is not limited to the image storage unit 1300, but may be a buffer memory which is arranged in the middle of a reproduction system and temporarily stores encoded image data.

As described above, since the detailed arrangement of the original image outer shape detection unit 1400 is the same as that shown in FIG. 8, a detailed description thereof will be omitted. However, when an irregular shape is determined, an image stored in the temporary storage unit 1600 is abandoned and binarized data which is stored in the image storage unit 1300 and is not subjected to any image frame processing is directly output to the image display unit 1800 or the image print unit 1850 in the error processing in the flow chart of FIG. 15, thus displaying or printing out an image. Other operations are the same as those in the first embodiment.

As described above, according to the fourth embodiment, upon reproducing and outputting an original image stored in the image storage unit 1300, an original image that cannot be subjected to appropriate image frame addition processing, such as an original with a halftone foundation, or the like can be discriminated, and inappropriate image frame addition processing and image frame erasing processing can be avoided. Therefore, reproduction of a strange image or erasing of necessary information in an image can be prevented.

For an image which cannot be subjected to appropriate image frame addition processing, since an image which is not subjected to the image frame processing is output, even when a plurality of original images are to be subjected to the image frame processing and printed out, the processing can continue without requiring any intervening operator. Accordingly, an image processing apparatus with higher operability and reliability can be provided.

In the description of this embodiment, the image frame processing unit 1500 and the original image outer shape detection unit 1400 are independently arranged for the sake of descriptive convenience. However, since these units have many common arrangements, they are constituted as a single circuit block in practice to attain higher efficiency.

In this embodiment, the image data subjected to the image frame processing is output to the image display unit 1800 and the image print unit 1850. However, this embodiment is not limited to these units. For example, the image data may be transmitted to an external apparatus via an interface or the like.

<Fifth Embodiment>

The fifth embodiment according to the present invention will be described below. Since the basic arrangement of the image processing apparatus of the fifth embodiment is the same as that of the fourth embodiment described above, a detailed description thereof will be omitted.

When the original image outer shape detection unit 400 determines that the outer shape of the original image which is being currently processed is not a rectangular shape, original image data which is being stored in the temporary storage unit 1600 is abandoned, and the function of the image frame processing unit 1500 is canceled. Thereafter, an original image (with a background) recorded in the image storage unit 1300 is read out again, and the readout image is written in the temporary storage unit 1600 comprising, e.g., a video RAM, in the same manner as in the above-mentioned fourth embodiment.

In the fourth embodiment described above, an original image, the outer shape of which is determined to be an irregular shape, cannot be subjected to first image frame addition processing by a dedicated circuit in the image frame processing unit 1500. In view of this problem, the fifth embodiment is characterized in that an original image having an irregular outer shape is subjected to second image frame processing by software on the temporary storage unit 1600. Note that the software processing described in the fifth embodiment is realized when the MPU 1900 operates in accordance with the control program stored in the ROM 1910.

In the second image frame processing in the fifth embodiment, the outer shape of the original image is estimated by a software program, and an image frame is added in accordance with the estimation result. The algorithm of the second image frame processing in the fifth embodiment will be described below with reference to FIGS. 18 and 19.

Figure 18:
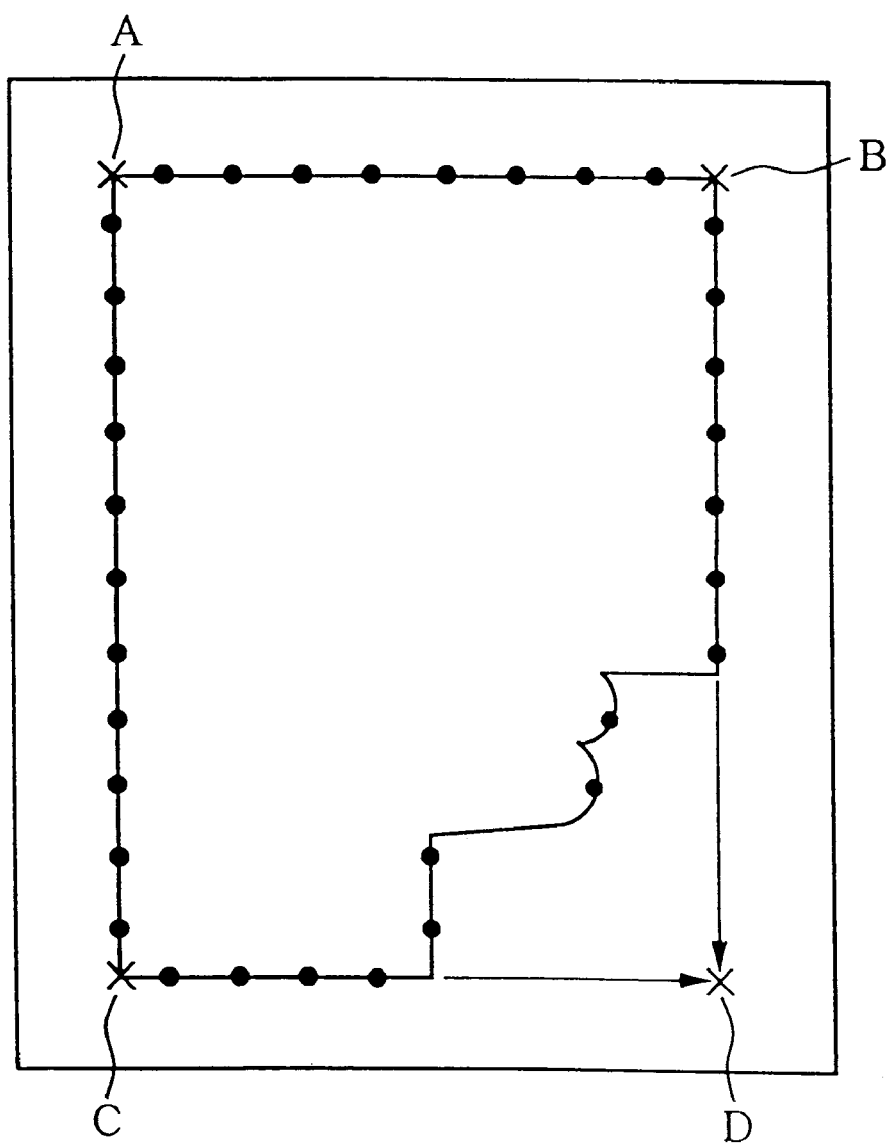
FIG. 18 is a view for briefly explaining the outer shape estimation processing of an original image in the fifth embodiment.
Figure 19:
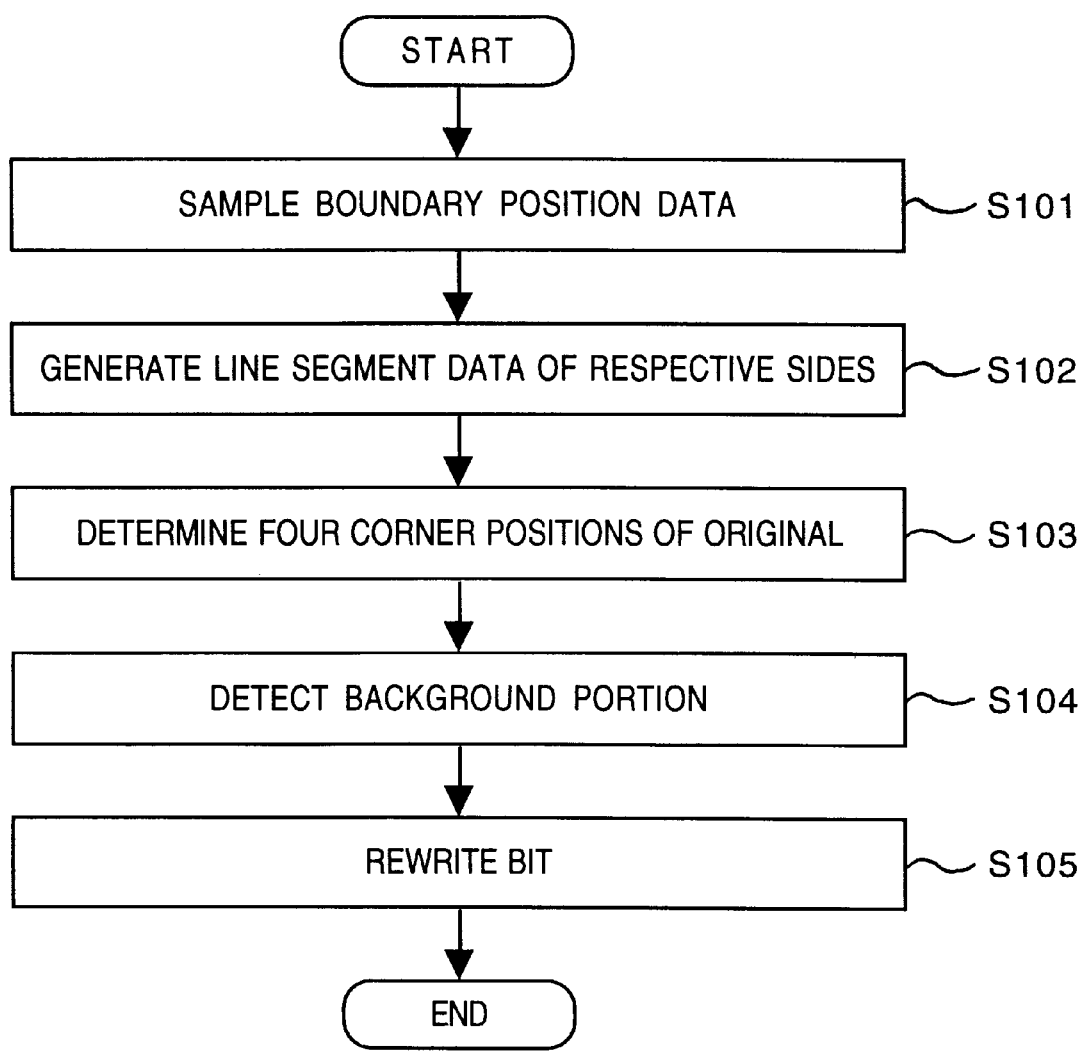
FIG. 19 is a flow chart showing the image frame processing contents in the fifth embodiment.

FIG. 18 is a view for explaining the state wherein the second image frame processing based on outer shape estimation is performed for binary image data shown in FIG. 3B. FIG. 19 is a flow chart showing the second image processing procedure, and the control program that realizes this flow chart is stored in the ROM 1910, as described above.

In step S101 in FIG. 19, a predetermined number of position data on the boundary lines between the original region and the background region on original image data are sampled. The sampling points are those illustrated on the right, left, upper, and lower sides of the original image shown in FIG. 18. As the sampling method, the MPU 1900 two-dimensionally detects white pixels on the binarized original image data stored in the temporary storage unit 1600 from the outer periphery toward the inner periphery, and can extract points (sampling points) which are determined to be present on the boundary lines between the original and the background.

Note that the boundary point position data on the right and left sides in FIG. 18 may use data sampled by the circuit of the original image outer shape detection unit shown in FIG. 8 described above. In this case, when the circuit is applied, even when the original image outer shape detection unit 1400 determines that the original image does not have a rectangular shape, the reproduction processing of an image (i.e., the write processing of image data subjected to the image frame processing into the temporary storage unit 1600) must be completed.

However, since the original image outer shape detection unit 1400 samples the boundary points by sequential processing based on scanning in the horizontal direction, a sufficient number of sampling points cannot be obtained for boundary point position data on the upper and lower sides in FIG. 18. Therefore, in order to obtain sampling points on the upper and lower sides, the MPU 1900 must perform software detection processing in the vertical direction.

In step S102, line segment data of the right, left, upper, and lower sides are formed by connecting a plurality of boundary point data on the respective sides. In step S103, using two line segment data, points of four corner positions A, B, C, and D of the original are determined. In step S104, pixels corresponding to a portion outside the original image, i.e., the background portion are detected on the basis of the positions A, B, C, and D. In step S105, the pixels of the background portion are rewritten from black ones to white ones (from 1 to 0). With the above-mentioned processing, the second image frame processing in the fifth embodiment is realized.

In the above-mentioned second image frame processing, a small black portion (having a width for several bits) outside the boundary is left in the bit rewriting processing in step S105 so as to realize the image frame addition processing, or a portion (having a width for several bits) slightly inside the boundary is also rewritten to white pixels so as to realize the image frame erasing processing. The bit width corresponding to the image frame can be appropriately set in accordance with the feature of image data to be processed, the image forming characteristics in the image processing apparatus, and the like.

As described above, according to the fifth embodiment, even for an original image which cannot be subjected to hardware image frame processing in the image frame processing unit 1500 since its binarized outer shape is an irregular shape, software image frame processing can be performed. Hence, an original image which should be subjected to the image frame processing even though a long processing time is required can be coped with.

<Sixth Embodiment>

The sixth embodiment according to the present invention will be described below. Since the basic arrangement and operation in an image processing apparatus of the sixth embodiment are the same as those in the fifth embodiment, a detailed description thereof will be omitted.

In the sixth embodiment, upon completion of the second image frame processing as software processing on the temporary storage unit 1600 described above in the fifth embodiment, an original image as the processing result is stored in the image storage unit 1300 parallel to required image output processing after it is encoded if required. At this time, since original image data stored in the image storage unit 1300 is managed by, e.g., a table or the like in the RAM 1920, the corresponding management data is updated concurrently.

With this processing, the original image that has been subjected to the image frame processing by software can be read out from the image storage unit 1300 by searching for an original image already subjected to the image frame processing when an image reproduction request of another image frame processing (second and subsequent operations) is generated again, thus realizing high-speed image frame processing.

As described above, according to the sixth embodiment, once an original image has been subjected to the second image frame processing by software, it can be output in the next and subsequent reproduction processing operations at a processing speed as fast as the first image frame processing in the image frame processing unit 1500.

Note that the original image subjected to the first image frame processing in the image frame processing unit 1500 can also be stored in the image storage unit 1300. However, since the first image frame processing is executed by the dedicated circuit, its processing speed is greatly higher than that of the second image frame processing realized by software processing. Therefore, whether or not the sixth embodiment is applied to the first image frame processing can be determined in accordance with the use capacity in the image storage unit 1300.

<Seventh Embodiment>

The seventh embodiment according to the present invention will be described below. Since the basic arrangement and operation in an image processing apparatus of the seventh embodiment are the same as those in the fifth embodiment, a detailed description thereof will be omitted.

The above-mentioned sixth embodiment has exemplified an example wherein original image data subjected to the image frame processing is stored in the image storage unit 1300 in order to attain the second and subsequent image frame processing operations at high speed. The seventh embodiment is characterized in that only the boundary information in the original image data subjected to the image frame processing is stored in the image storage unit 1300, thus reducing the use capacity in the image storage unit 1300.

In the seventh embodiment, as for an original image which has been subjected to the second image frame processing, for example, only additional information data that represent the boundary between the original image and the background portion such as the coordinate data of the four corner position data A, B, C, and D of the original image shown in FIG. 18, and the like are preserved in the image storage unit 1300.

Every time the second and subsequent image reproduction requests are generated, writing processing (step S105 in FIG. 19) from black pixels to white pixels of the background portion as relatively high-speed processing of the second image frame processing realized by software is redone.

As described above, according to the seventh embodiment, since only the background boundary information of the original image data subjected to the second image frame addition processing is preserved, the capacity of data to be additionally preserved can be greatly reduced as compared to a case wherein the original image data itself is preserved.

Therefore, the additional information can be preserved using a nonvolatile storage means such as an S-RAM backed up in the apparatus, and in this case, the image frame processing time realized by software processing can be shortened.

As described above, according to the fourth to seventh embodiments, when the image processing apparatus which stores and records image data in a state wherein the outer shape size information of an original image can be obtained by adding a black background portion to the image in advance, performs the image frame processing of image data stored in a storage medium by hardware, an image that cannot be subjected to appropriate image frame addition processing can be discriminated, thus avoiding inappropriate image frame addition. Therefore, when a printer prints out an image added with an image frame, a strange image due to addition of an inappropriate image frame can be avoided from being output, thus reducing wasteful outputs, i.e., wasteful cost. In this way, the image frame processing and the print-out operation of a plurality of stored original images can be continuously performed without requiring any intervening operator.

Even for irregular image data to which the image addition processing cannot be performed by hardware, image frame processing based on software processing is allowed, thus realizing flexible image frame processing independently of the types of target images.

Image data that has been subjected to the second image frame processing by software is held in the apparatus, and is directly read out in the second and subsequent reproduction operations, thus attaining the second and subsequent reproduction operations at high speed.

In place of preserving the image itself that has been subjected to the second image frame processing, only boundary information between the original image and the background is preserved, thereby greatly reducing the amount of data to be additionally preserved.

<Eighth Embodiment>

With the processing described in the first to seventh embodiments, an original image can be read and output (displayed or printed) while solving the problems in at least the image frame processing.

Figure 29:
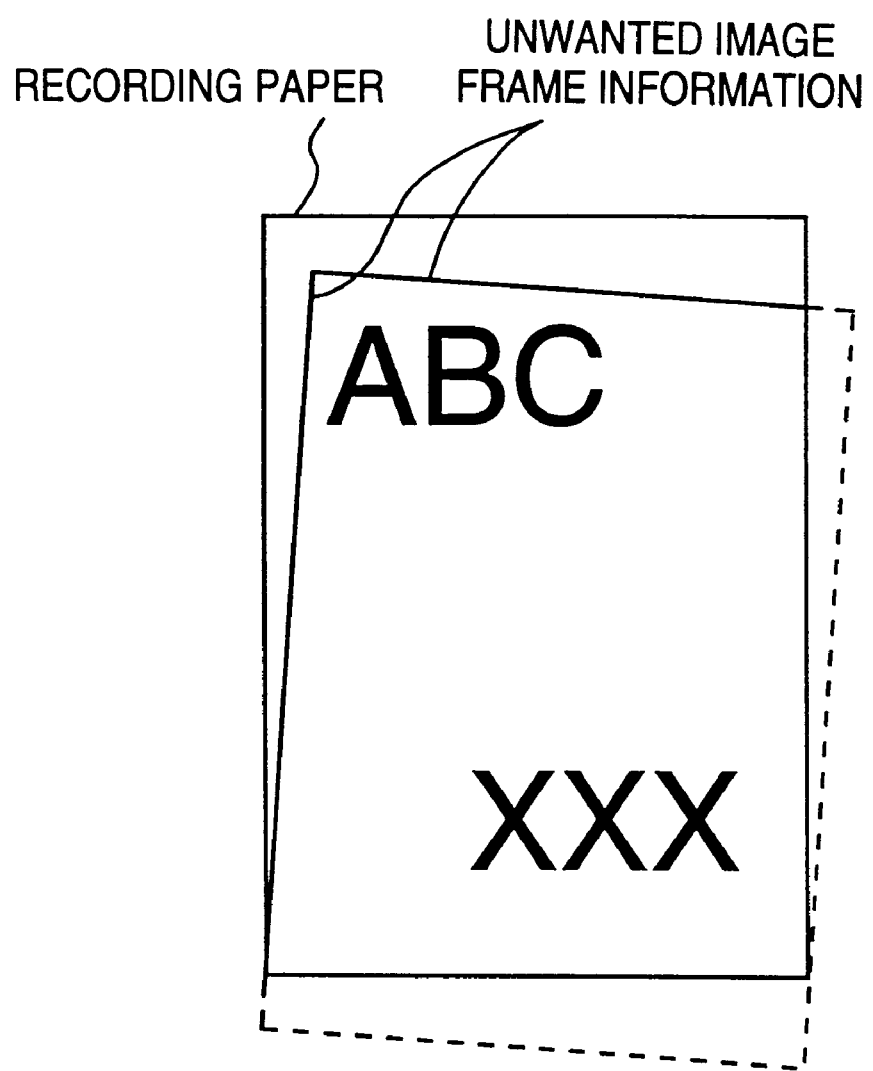
FIG. 29 is a view showing an example of the drawback of the image frame addition processing.

However, when the above-mentioned image frame addition processing is unconditionally applied to all the original images, for example, if the original image to be reproduced has substantially the same size as that of a print paper sheet used in the print-out operation, and if the original is displaced or skewed during the reading operation of the original image, only a portion of the image frame portion of the original image is added to the print paper sheet, and the displacement of the original is emphasized, as shown in FIG. 29.

As a method of solving this problem, the image frame erasing processing for converting all the pixels in the black background portion outside an original into those of the foundation color of the original image is provided as the additional function of the image frame processing. Then, after an original image is read (see FIG. 2A), the read image is binarized (FIG. 2B), and the operator selects one of the image frame addition processing mode (see FIG. 2C) and the image frame erasing processing mode (FIG. 2D), as needed, thereby coping with the above-mentioned problem.

However, with this method, when a large number of original images having various sizes are successively read out from a recording medium, optimal image frame processing is performed for each original image (i.e., image frame erasing processing is performed for an original image having a size substantially the same as that of a print paper sheet, and image frame addition processing is performed for an original image smaller than the print paper sheet), and the processed images are printed, the operation efficiency deteriorates considerably.

In view of this problem, the eighth embodiment has as its object to provide an image reproduction apparatus and an image reproduction method, which can successively read out a large number of original images having various sizes, can automatically perform optimal image frame processing for the respective original images without being attended by any operator, and can continuously print out the processed image.

Figure 20:
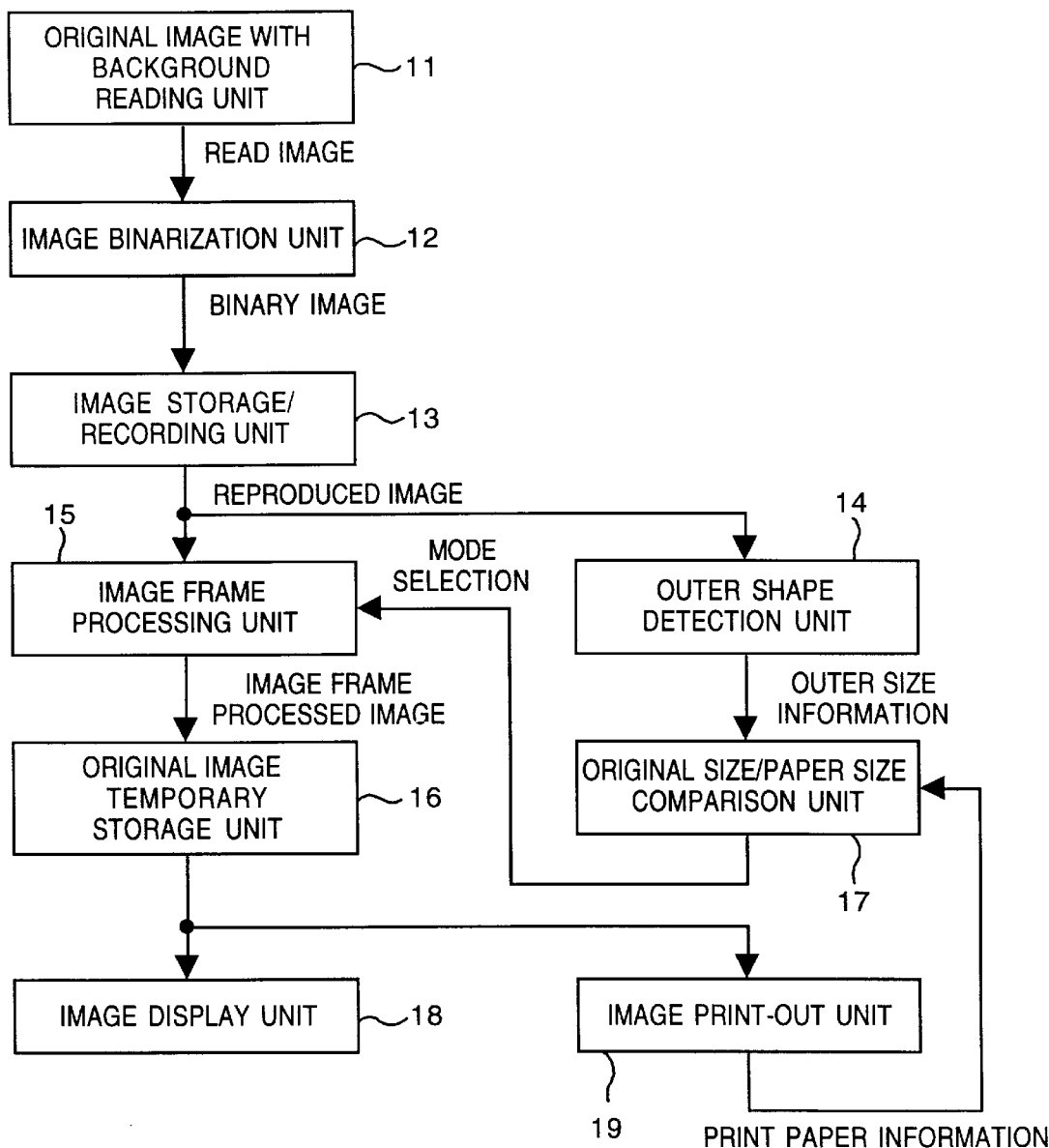
FIG. 20 is a block diagram showing the basic arrangement of an image reproduction apparatus according to the eighth embodiment of the present invention.

FIG. 20 is a block diagram showing the basic arrangement of an image reproduction apparatus according to the eighth embodiment of the present invention.

The image reproduction apparatus comprises an image reading unit 11 for reading an original image as an object together with the background having a color different from the foundation color of an original, an image binarization unit 12 for converting the image information read by the image reading unit 11 into pixel signals of binary levels, i.e., black and white levels using, e.g., a digital comparator and the like, and an image storage/recording unit 13 for storing and recording the binarized image information on a recording medium such as a magnetooptical disk device.

Of these units, the image reading unit 11 and the image binarization unit 12 are not always indispensable as the constituting elements of the apparatus of this embodiment, and they may be separated as an independent image recording apparatus by adding the image storage/recording unit 13 thereto.

Furthermore, an original image outer shape detection unit 14 and an image frame processing unit 15 are connected to the output side of the image storage/recording unit 13. The original image outer shape detection unit 14 detects the outer shape and size of a reproduced original image by using a reproduced image signal reproduced from the image storage/recording unit 13 and by utilizing the fact that the foundation color (white) in the original is different from the background color (black) outside the original. More specifically, the original image outer shape detection unit 14 is constituted by an original width detection circuit (FIG. 24) and an original length detection circuit (FIG. 25), as will be described later. The image frame processing unit 15 performs image frame processing for adding or erasing the image frame to or from the reproduced image signal by high-speed sequential processing by utilizing the different background colors of the reproduced image signal. More specifically, the image frame processing unit 15 comprises an image frame processing circuit shown in FIG. 5 described above.

An original image temporary storage unit 16 is connected to the output side of the image frame processing unit 15. The original image temporary storage unit 16 is a storage means comprising, e.g., a semiconductor memory for temporarily storing at least one original image that has already been subjected to the image frame processing. An original size/paper size comparison unit 17 is connected to the output side of the original image outer shape detection unit 14. The original size/paper size comparison unit 17 obtains the outer size information of a target original which is being currently processed from the original image outer shape detection unit 14, and also obtains the currently set print paper information, thus comparing these two pieces of information.

On the output side of the original image temporary storage unit 16, an image display unit 18 comprising a CRT, a liquid crystal display, or the like for monitor-displaying the original image stored in the original image temporary storage unit 16, and an image print-out unit 19 comprising, e.g., an LBP (laser beam printer) or the like for printing out the stored original image onto a print paper sheet are connected.

In characteristic operations until the print-out operation in the image reproduction apparatus of this embodiment will be explained below with reference to the flow chart of FIG. 21.

In step S201, an original image is read out from the recording medium, and is temporarily stored in the original image temporary storage unit 16. In step S202, the outer shape detection unit 14 detects the outer size of the original by utilizing the fact that the background portion is black. In step S203, the original size/paper size comparison unit 17 compares the outer size information of the original image obtained by the outer shape detection unit 14 and the outer size information of the currently selected print paper sheet. As a result, if the original image size is substantially equal to or larger than the print paper size, the image frame processing unit 15 is instructed to select the image frame erasing processing mode (step S204). Thereafter, the print-out processing is executed (step S205).

On the other hand, if the original image size is smaller than the print paper size, the image frame processing unit 15 is instructed to select the image frame addition processing mode (step S206), and the image centering/print mode is selected (step S207). In step S205, the print-out processing is executed.

Figure 22A:
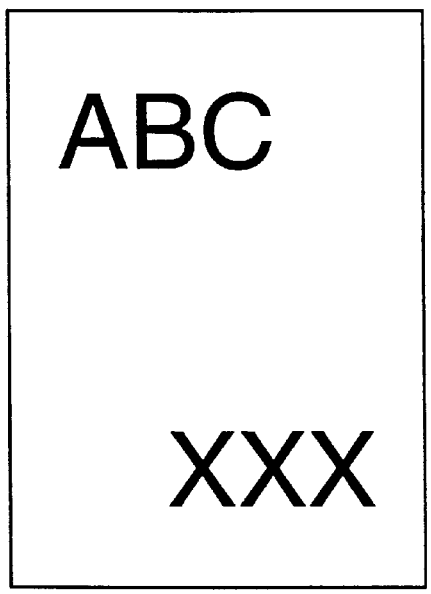
FIGS. 22A and 22B are explanatory views of the image frame processing automatic selection function in the eighth embodiment.
Figure 22B:
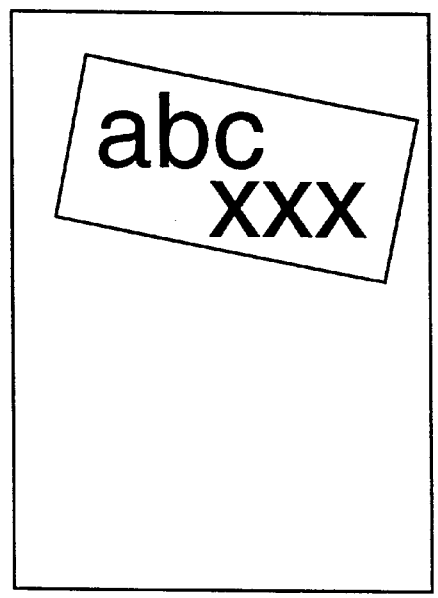

As described above, since the outer shape detection unit 14 and the original size/paper size comparison unit 17 constitute an automatic mode selection means, as exemplified in FIGS. 22A and 22B (FIG. 22A shows the state upon selecting the image frame erasing mode, and FIG. 22B shows the state upon selecting the image frame addition mode), even when a stack of originals having various sizes are to be subjected to print processing, optimal image frame processing can be automatically performed for each original, and processed images can be printed onto print paper sheets.

The image frame processing operation actually performed in the image frame processing unit 15 will be described below.

In the basic operation of the image frame processing unit, effective pixel period signals shown in FIG. 5 are sequentially generated for the currently read main scanning line, and an image frame is formed by leaving black background portions each having a width for several dots before and after (right and left) an original in such a manner that the signal is enabled immediately before the left end of the original and is disabled immediately after the right end of the original (to forcibly convert an image signal to white level during the non-effective period).

However in practice, since the image frame cannot be formed on the upper and lower sides of an original by only evaluation in one main scanning line, an image frame processing template shown in FIG. 7 is generated using a FIFO (first-in, first-out) memory, thereby adding the image frame not only on the right and left sides but also on the upper and lower sides.

Referring to FIG. 7, four sets of four pixels (full circular marks in FIG. 7) on the four corners around the position of the pixel of interest (the currently output pixel) serve as evaluation points, and when all the four pixels are white (or black), an evaluation value "white" (or "black") is assigned to each point.

Figure 23A:
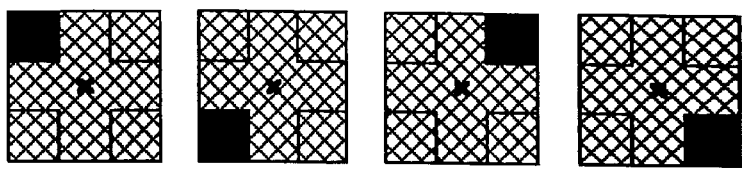
FIGS. 23A to 23D are explanatory views showing an example upon executing the image frame processing using an evaluation template.
Figure 23B:

When the image frame addition processing is performed using this evaluation template, the effective pixel period for the pixel of interest is enabled if an evaluation value "white" is assigned to one of the evaluation points (see FIG. 23A), and it is disabled if evaluation values "black" are assigned to the four evaluation points (see FIG. 23B), thereby leaving a black foundation defined by 2-dot wide upper and lower sides and 3-dot wide right and left sides as the black frame of the original.

Figure 23C:
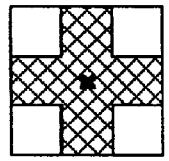
Figure 23D:
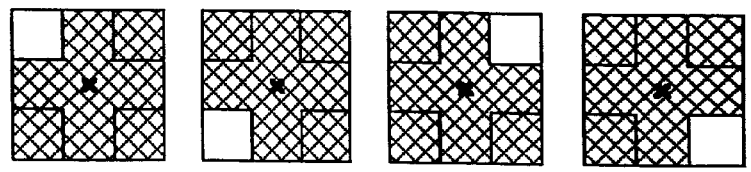

On the other hand, when the image frame erasing processing is performed, the effective pixel period is enabled when evaluation values "white" are assigned to all the four evaluation points at the four corners (see FIG. 23C), and it is disabled when an evaluation value "black" is assigned to one of the four evaluation points (see FIG. 23D). With this processing, since the range defined by 2-dot wide upper and lower sides and 3-dot wide right and left sides inside the effective range of the original serves as an effective pixel period, the surrounding black background portion is consequently completely erased (converted into white pixels).

Since the arrangement and operation of the image frame processing unit itself are the same as those in FIG. 5, a detailed description thereof will be omitted.

The operation of the original image outer shape detection unit 14 shown in FIGS. 24 and 25 will be described in detail below. Note that FIG. 24 is a circuit diagram showing the arrangement of the original width detection circuit, and FIG. 25 is a circuit diagram showing the arrangement of the original length detection circuit.

Figure 24:
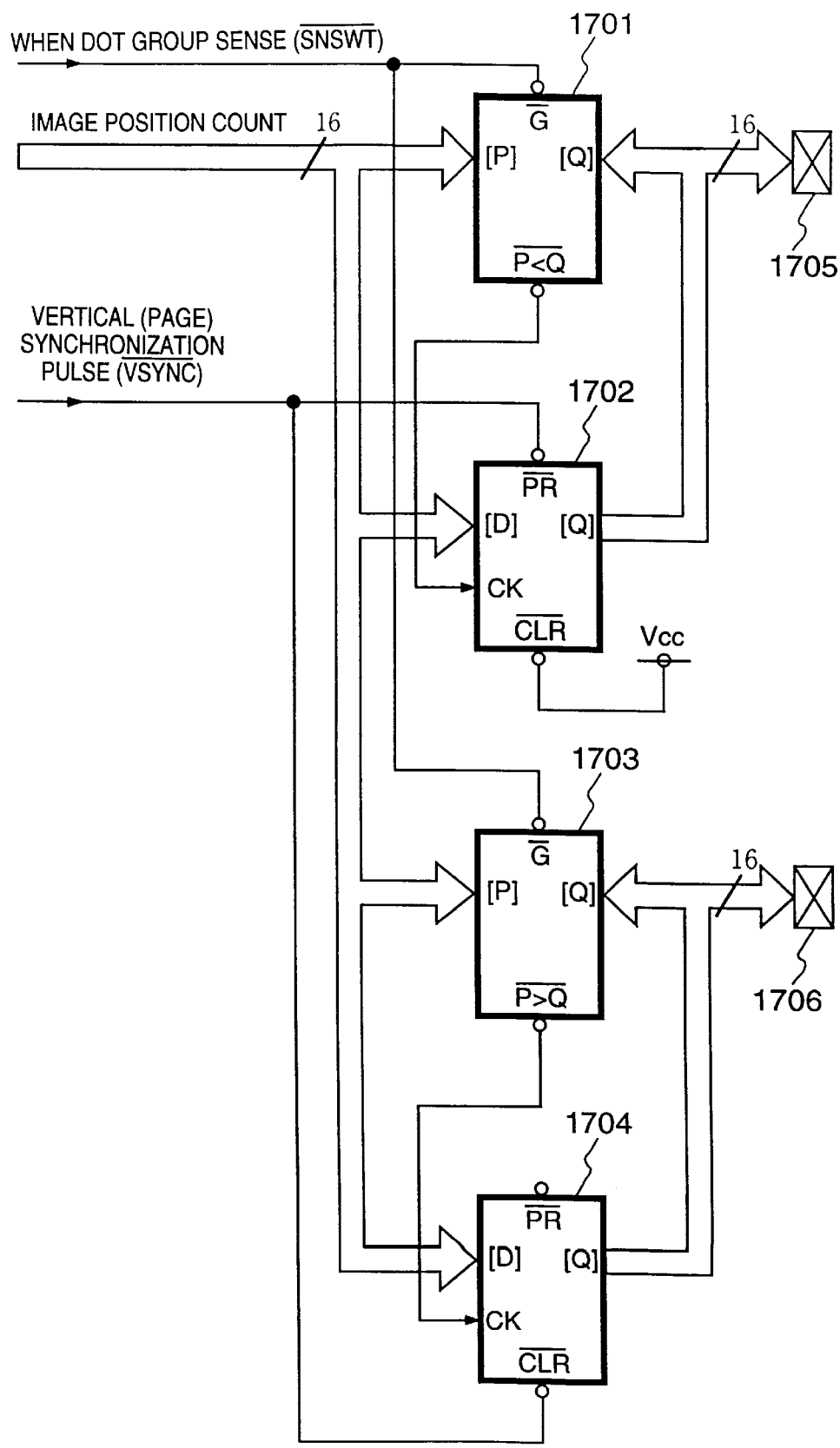
FIG. 24 is a circuit diagram showing the arrangement of an original width detection circuit.
Figure 25:
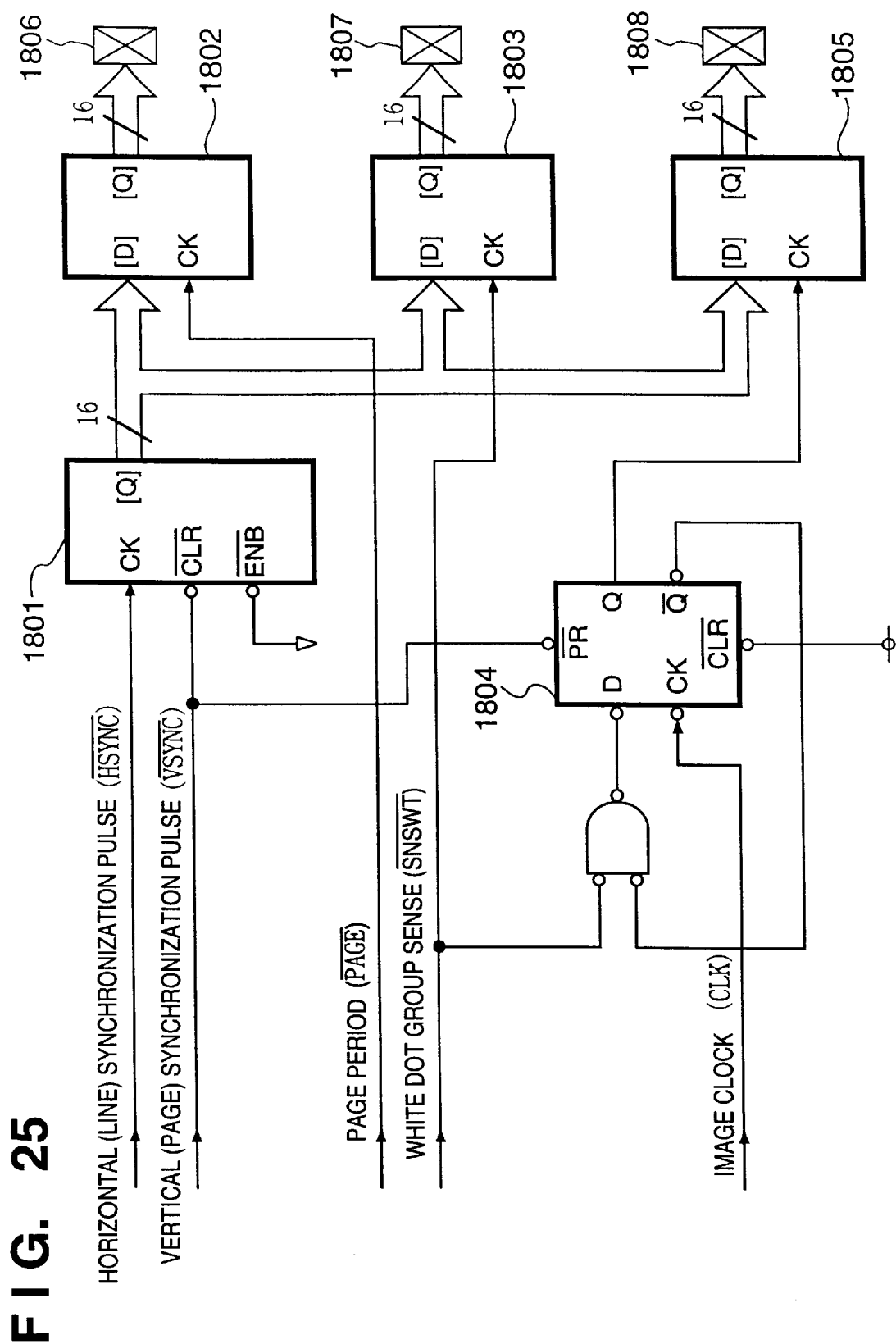
FIG. 25 is a circuit diagram showing the arrangement of an original length detection circuit.

Referring to FIG. 24, reference numeral 1701 denotes a 16-bit comparator having a $\overline{P<Q}$ terminal; 1702 and 1703, 16-bit flip-flops; and 1704, a 16-bit comparator having a $\overline{P>Q}$ terminal. The flip-flops 1702 and 1703 are respectively initialized to FFFF (hexadecimal notation) and 0000 (hexadecimal notation) in response to a vertical (page) synchronization pulse ($\overline{VSYNC}$) as the start pulse of an original.

The input terminal groups [P] of the comparators 1701 and 1704 receive the current data position of the original line generated by a 16-bit counter 501 shown in FIG. 5, and the gate output enable terminals [G] of the comparators 1701 and 1704 receive a white dot group sense signal ($\overline{SNSWT}$) generated using the evaluation template shown in FIG. 7.

Upon detecting the first white dot group in the original, low-level pulses are output to the $\overline{P<Q}$ and $\overline{P>Q}$ terminals of the comparators 1701 and 1704, and the current data positions at that time are stored in the output terminal groups [Q] of the flip-flops 1702 and 1703.

Figure 26:
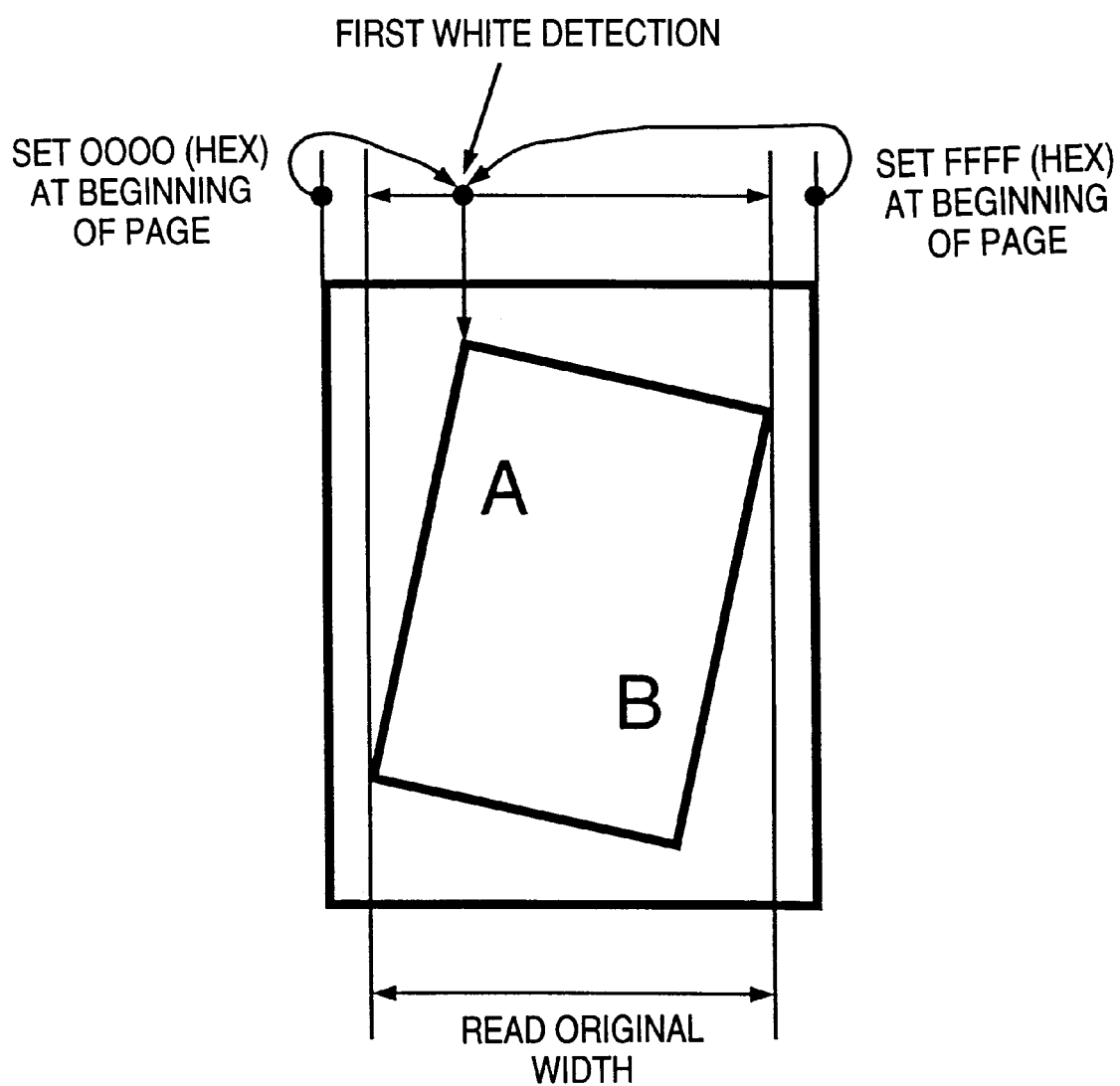
FIG. 26 is a view showing a case wherein the maximum original width of an original is to be calculated.

Thereafter, the comparator 1701 updates the value of the output terminal group [Q] of the flip-flop 1702 when a smaller current data position (i.e., the white position on the further left side in the original) is detected, and the comparator 1704 updates the value of the output terminal group [Q] of the flip-flop 1703 when a larger current data position (i.e., the white position on the further right side in the original) is detected. As a consequence, upon completion of reading for one page of the original, the final output values of the flip-flops 1702 and 1703 are read out via input ports 1705 and 1706 connected to an MPU (microprocessor unit) bus (not shown), thereby obtaining the right and left positions of the original, i.e., the maximum original width (see FIG. 26).

Referring to FIG. 25, a 16-bit counter 1801 counts the number of horizontal synchronization pulses ($\overline{HSYNC}$) in a page period signal ($\overline{PAGE}$), and the final output value is read out via an input port 1806, thus obtaining the original length.

On the other hand, the trailing end position of the original can be detected by reading out the final line position at which a white dot group was detected held in a 16-bit flip-flop 1803 via an input port 1807, if required. Furthermore, the leading end position of the original can be detected by applying the first white dot group detection low-level pulse generated using a flip-flop 1804 as a clock so as to read out via an input port 1808 the start line position at which a white dot group held in a 16-bit flip-flop 1805 was detected.

As described above, in the eighth embodiment, the size of the original image to be reproduced is detected by utilizing the fact that the black background is added to the original image to be read out and reproduced from the recording medium, and the size information of the currently selected print paper sheet and the detected size information of the original image are compared with each other. When the comparison result indicates that the two sizes are substantially equal to each other or both the length and width of the original image are larger than those of the print paper sheet, the automatic selection function enables the image frame erasing means; otherwise, the function enables the image frame addition means. In this manner, when original images having various sizes with respect to the print paper sheets selected in advance by the operator are to be output, optimal image frame processing can be automatically performed in units of original sizes, and the processed images can be printed out. With this function, when the original size is substantially equal to the print paper size, the image frame erasing processing mode is automatically selected, thus preventing an image from being spoiled owing to an unwanted image frame generated inside an image as a result of slight displacement between the reproduced original image and the print paper sheet.

Furthermore, when the original size is smaller than the print paper size, the image frame addition processing mode is automatically selected, and centering processing is automatically performed to print out the processed image, thus leaving the size information of an original.

<Ninth Embodiment>

The ninth embodiment of the present invention will be described below.

The basic arrangement of the ninth embodiment is the same as that of the eighth embodiment, and the sole difference is that the image print-out unit 19 can select a plurality of different paper sizes.

Figure 27:
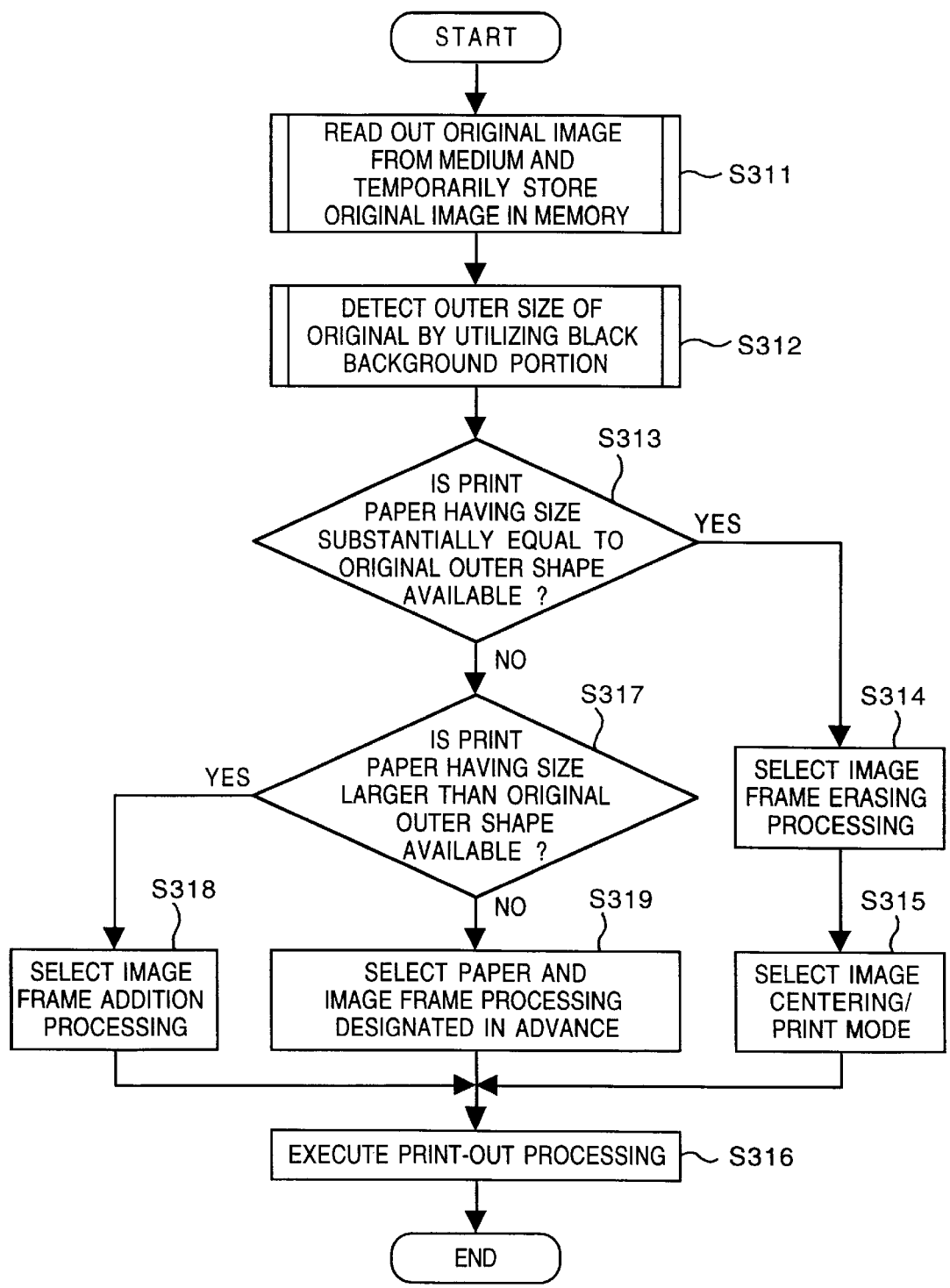
FIG. 27 is a flow chart showing the operation of an image reproduction apparatus according to the ninth embodiment.

The characteristic operations until the print-out operation in the image reproduction apparatus of this embodiment will be explained below with reference to the flow chart of FIG. 27.

In step S311, an original image is read out from the recording medium, and is temporarily stored in the original image temporary storage unit 16. In step S312, the outer shape detection unit 14 detects the outer size of an original by utilizing the fact that the background portion is black. In step S313, the original size/paper size comparison unit 17 performs size comparison using the outer size information of the original image obtained by the original image outer shape detection unit 14 and the outer size information of each of a plurality of different paper sheets that can be selected by the image print-out unit 19.

If a paper size substantially equal to the original size is found from the plurality of different selectable paper sizes, the image frame processing unit 15 is instructed to select the image frame erasing processing mode (step S314), and thereafter, the centering/print mode is selected (step S315), thus printing out an image without any image frame using a paper sheet having a substantially equal size (step S316). If a paper sheet having a substantially equal size is not found, it is checked if a paper size larger than the original size is available (step S317). If such paper sheet is available, the image frame processing unit 15 is instructed to select the image frame addition processing mode (step S318), thereby printing out an image with an image frame using the larger paper sheet (step S316).

When no print paper sheets that meet the above-mentioned conditions are selected, an appropriate image processing mode and a print paper sheet used in the print-out operation must be selected by executing, e.g., a means designated in advance (step S319). As the simplest way to do this, the print-out operation is suspended at that time, and the operator is called to select an appropriate mode. However, with this method, when a large number of original images are to be successively printed, if the operator is absent, the print-out processing is interrupted for a long period of time, and this method is inappropriate in some applications.

In this case, for example, a print paper sheet having a size closest to the outer shape of an original is selected, the image frame erasing mode is selected, and the reduction processing of the original image is performed on the basis of both the original image size information and the paper size information, and the processed image is printed out. In this manner, the processing can be automated, and the print-out processing can continue without being attended by any operator.

As described above, in the ninth embodiment, the size of the original image to be read out and reproduced from the recording medium is detected, the detected size information of the original image is compared with the size information of each of a plurality of currently available different print paper sheets, and it is checked based on the comparison results if a print paper sheet having a size substantially equal to the original image size is available. If the width and length of all the print paper sheets available are smaller than those of the original image, the image frame erasing means is enabled, and the image is printed out using a paper sheet having a size substantially equal to the original image size (if the sizes of all the paper sheets are smaller than the original image size, the largest one is selected). On the other hand, when the length and width of the original image are smaller than those of all the print paper sheets available, the image frame addition means is enabled, and the image is printed out using a print paper sheet having an appropriate size that can prevent the image frame added to the original image from being omitted. In this manner, appropriate image frame processing can be applied to the original image by combining the image frame processing function and the print paper selection function, and the processed image can be printed out.

As described in the eighth embodiment, when the image frame addition means is selected and the original image is to be printed out onto a print paper sheet having a size larger than the original image size, the centering function is also used at the same time to prevent the image frame from, e.g., being omitted, thereby more effectively providing the size information of the reproduced original image.

<10th Embodiment>

The basic arrangement of the image reproduction apparatus of this embodiment is the same as those in the eighth and ninth embodiments, and the sole difference is that an image rotation unit that rotates the reproduced image (through 90° or 270°) is added.

Figure 28:
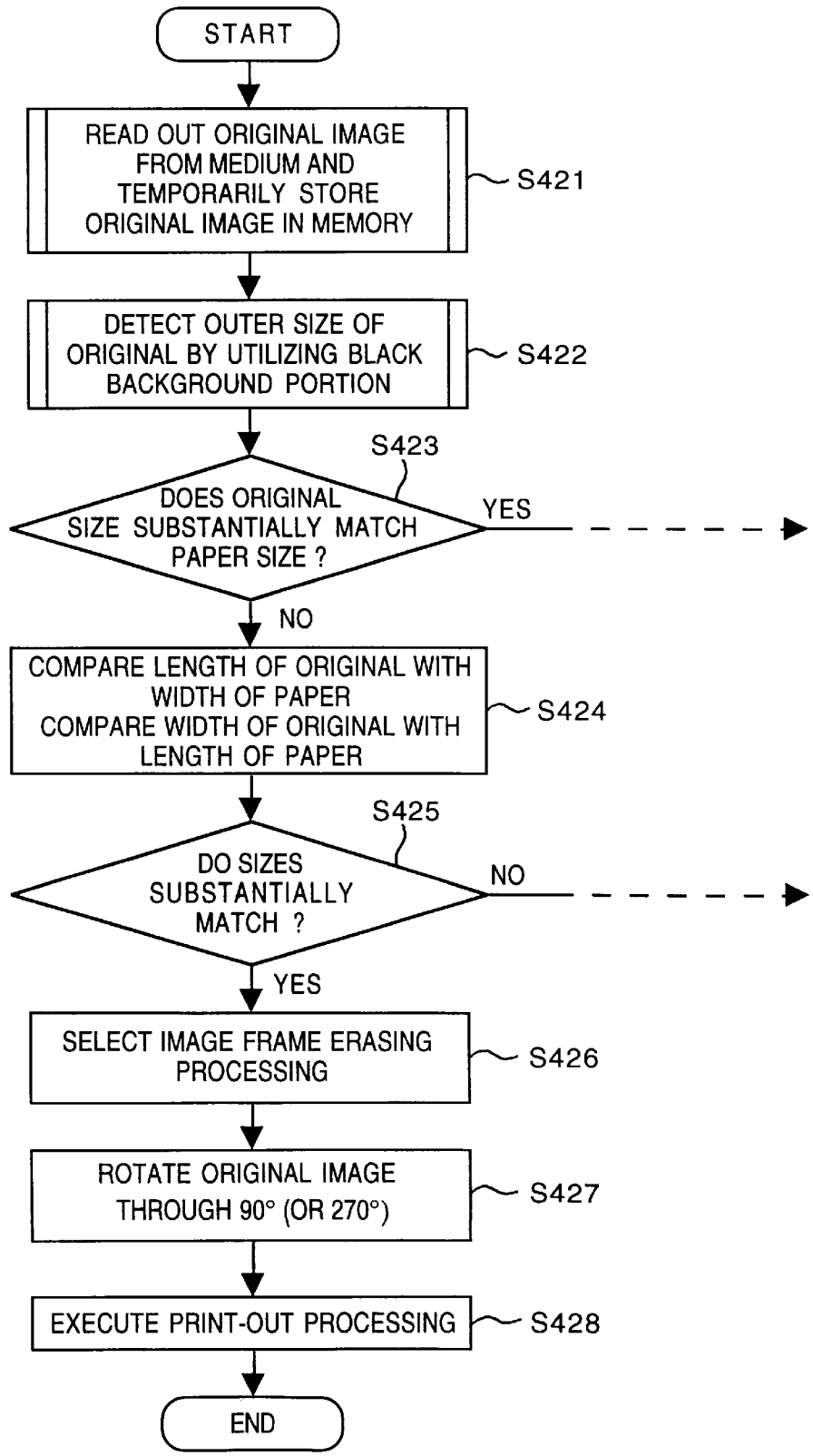
FIG. 28 is a flow chart showing the operation of an image reproduction apparatus according to the 10th embodiment.

The characteristic operations until the print-out operation in the image reproduction apparatus of this embodiment will be explained below with reference to the flow chart of FIG. 28.

In step S421, an original image is read out from the recording medium, and is temporarily stored in the original image temporary storage unit 16. In step S422, the outer shape detection unit 14 detects the outer size of an original by utilizing the fact that the background portion is black. In step S423, the original size/paper size comparison unit 17 compares the original size and the paper size. If the comparison result indicates that the two sizes do not match each other, the length of the original image is compared with the width of the paper sheet, and the width of the original image is compared with the length of the paper sheet (steps S424 and S425). If these sizes substantially match each other, the image frame erasing processing mode is selected and enabled (step S426), and the image rotation unit is enabled (step S427). Thereafter, the processed image is printed out (step S428). With this processing, an original image read by rotating an original through 90° or 270° can be coped with.

In this embodiment, even when an original image is stored and recorded in the recording medium while being rotated through 90° or (270°), such rotation state can be automatically detected upon reproduction, and the image can be rotated again and printed out.

Note that the present invention is not limited to the illustrated embodiments, and various modifications may be made. More specifically, in each of the above embodiments, the effects mainly associated with the image frame processing and the print-out operation have been discussed. In addition, when the reproduced original image is to be displayed on a display, the image can be automatically displayed with reference to the upper left corner, or can be displayed while being reduced at an appropriate reduction magnification, so that the entire original image may fall within the effective display region without being omitted. In this manner, various other applications may be made by utilizing only the fact that the black background is added to the original image.

As described in detail above, according to the eighth to 10th embodiments, when original images having various sizes are to be output onto a print paper sheet selected in advance by the operator, optimal image frame processing can be automatically selected in units of original size, and processed images can be printed out. In addition, the following effects are also expected.

(1) For example, when the image frame addition means is selected and the original image is to be printed out onto a print paper sheet having a larger size, the centering function is also used at the same time to print out the image so that the center of the original image matches that of the print paper sheet. In this manner, the image frame can be prevented from being omitted, and the size information of the reproduced original image can be provided more effectively.

(2) Since the outer size information of an original image required for automatic processing is automatically generated from the original image itself by utilizing the fact that the background is black, the present invention can also be applied to, e.g., an original image which is read using a black background for the purpose of preventing an image on the back side from being copied, thus assuring a broad application range.

(3) Since originals having various sizes can be automatically output onto print paper sheets having a single size in optimal states, a print-out pattern which is suitable for the purpose of filing and re-using reproduced original image printouts by, e.g., a binder, can be realized.

On the other hand, print paper sheets are automatically selected, and originals having various sizes are printed out using paper sheets having sizes the same as the original sizes as much as possible. Only when no suitable paper size is available, an image is printed out on a print paper sheet having a larger size while leaving the image frame information. Therefore, a print-out pattern suitable for the purpose of distributing reproduced original printouts as copies of originals in the recording medium can be realized.

Furthermore, even when original images are stored and recorded while being rotated through 90° (or 270°), such rotation state can be automatically detected upon reproduction, and an image can be rotated again and printed out.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

reading means for reading an original image;

detection means for detecting an outer shape of the original image;

image frame addition means for adding an image frame to the original image in accordance with an outer shape detection result of said detection means;

determining means for determining whether or not an outer shape detecting result of said detection means is inappropriate for image frame addition processing by said image frame addition means; and control means for controlling said image frame addition means to inhibit addition of the image frame to the original image when said determining means determines that an outer shape detection result is inappropriate for the image frame addition processing.

2. The apparatus according to claim 1, wherein said reading means reads the original image together with a background having a color different from a foundation color of the original image.

3. The apparatus according to claim 2, wherein said image frame addition means adds the image frame to a boundary between the original image and the background.

4. The apparatus according to claim 1, wherein said determining means determines whether or not the outer shape of the original image is a predetermined shape.

5. The apparatus according to claim 2, wherein said detection means detects the outer shape of the original image by evaluating the boundary between the original image and the background.

6. The apparatus according to claim 4, wherein said determining means determines whether or not the outer shape of the original image is a rectangular shape.

7. The apparatus according to claim 1, wherein said detection means sequentially detects the outer shape of the original image in accordance with the reading operation of the original image by said reading means.

8. The apparatus according to claim 1, wherein said control means suspends the reading operation of said reading means in accordance with a determination result of said determining means.

9. The apparatus according to claim 1, wherein said control means generates information indicating that an outer shape of the original image is inappropriate for the image frame addition processing.

10. The apparatus according to claim 1, further comprising transmission means for transmitting the original image to which the image frame is added by said image frame addition means to an external apparatus, wherein said control means suspends transmission processing of said transmission means in accordance with a determination result of said determining means.

11. The apparatus according to claim 10, wherein said control means informs the external apparatus of the determination result of said determining means.

12. The apparatus according to claim 10, further comprising reception means for receiving a signal for designating an image frame processing type from the external apparatus, wherein said image frame addition means performs the image frame addition processing in accordance with the signal received by said reception means.

13. An image processing apparatus comprising:

reading means for reading an original image;

holding means for holding the original image read by said reading means;

detection means for detecting an outer shape of the original image;

first image frame addition means for performing first image frame addition processing for the original image in accordance with an outer shape detection result of said detection means;

transmission means for transmitting the original image to which an image frame is added by said first image frame addition means;

determining means for determining whether or not an outer shape detection result of said detection means is inappropriate for the first image frame addition processing by said first image frame addition means; and control means for controlling said transmission means to inhibit transmission of the original image subjected to the first image frame addition processing when said determining means determines that an outer shape detection result is inappropriate for the first image frame addition processing.

14. The apparatus according to claim 13, wherein when said transmission means does not transmit the original image subjected to the first image frame addition processing, said control means controls said transmission means to transmit the original image held in said holding means.

15. The apparatus according to claim 13, further comprising second image frame addition means for performing second image frame addition processing for the original image, wherein when said transmission means does not transmit the original image subjected to the first image frame addition processing, said second image frame addition means perform the second image frame addition processing for the original image held in said holding means, and said transmission means transmits the processed image to the external apparatus.

16. The apparatus according to claim 15, wherein the first image frame addition processing is performed in parallel with the reading operation of the original image by said reading means, and the second image frame addition processing, is performed after the reading operation of the original image by said reading means.

17. The apparatus according to claim 16, wherein the first image frame addition processing is implemented by hardware processing, and the second image frame addition processing is implemented by software processing.

18. An image processing apparatus comprising:

reading means for reading an original image;

original shape detection means for detecting an outer shape of the original image;

original end detection means for detecting leading and trailing ends of the original image;

image frame addition means for adding an image frame to the original image in accordance with an outer shape detection result of said original shape detection means;

transmission means for transmitting the original image to which the image frame is added by said image frame addition means;

determining means for determining whether or not an outer shape of the original image is inappropriate for the image frame addition processing by said image frame addition means in accordance with a detection result of said image end detection means; and control means for controlling said transmission means to inhibit transmission of the original image subjected to the image frame addition processing when said determining means determines that an outer shape of the original image is inappropriate for the image frame addition processing.

19. An image processing method comprising:

a reading step of reading an original image;

a detection step of detecting an outer shape of the original image;

an image frame addition step of adding an image frame to the original image in accordance with an outer shape detection result of said detection step;

a determining step of determining whether or not an outer shape detection result of said detection step is inappropriate for the image shape addition processing in said image frame addition step; and a control step of inhibiting addition of the image frame to the original image in said image frame addition step when said determining step determines that outer shape detection result is inappropriate for the image shape addition processing.

20. An image processing method comprising:

a reading step of reading an original image;

a holding step of holding the original image read in said reading step;

a detection step of detecting an outer shape of the original image;

an image frame addition step of adding an image frame to the original image in accordance with an outer shape detection result of said detection step;

a transmission step of, transmitting the original image to which an image frame is added in said first image frame addition step;

a determining step of determining whether or not an outer shape detection result of said detection step is inappropriate for the image frame addition processing in said image frame addition step; and a control step of inhibiting transmission of the original image subjected to the image frame addition processing in said transmission step when said determining step determines that an outer shape detection result is inappropriate for the image frame addition processing.

21. An image processing method comprising:

a reading step of reading an original image;

an original shape detection step of detecting an outer shape of the original image;

an original end detection step of detecting leading and trailing ends of the original image;

an image frame addition step of adding an image frame to the original image in accordance with an outer shape detection result of said original shape detection step;

a transmission step of transmitting the original image to which the image frame is added in said image frame addition step;

a determining step of determining whether or not an outer shape of the original image is inappropriate for the image frame addition processing by said image frame addition means in accordance with a detection result in said image end detection step; and a control step of inhibiting transmission of the original image subjected to the image frame addition processing in said transmission step when said determining step determines that an outer shape of the original image is inappropriate for the image frame addition processing.

22. An image processing apparatus comprising:

holding means for storing and holding an original image;

detection means for detecting an outer shape of the original image;

image frame means for performing image frame addition processing for the original image stored and held in said holding means in accordance with an outer shape detection result of said detection means;

determining means for determining whether or not an outer shape detection result of said detection means is inappropriate for image frame addition processing by said image frame addition means; and control means for controlling said image frame means to inhibit the image frame addition processing when said determining means determines that an outer shape detection result of said detection means is inappropriate for the image frame addition processing.

23. The apparatus according to claim 22, wherein the original image is stored and held in said holding means together with a background having a color different from a foundation color of the original image.

24. The apparatus according to claim 23, wherein said detection means detects the outer shape of the original image by evaluating a boundary between the original image and the background.

25. The apparatus according to claim 22, wherein said determining means determines whether or not the outer shape of the original image is a predetermined shape.

26. The apparatus according to claim 25, wherein said determining means determines whether or not the outer shape of the original image is a rectangular shape.

27. The apparatus according to claim 22, wherein when said determining means determines that the outer shape detection result of said detection means is inappropriate for the image frame addition processing, said control means suspends the image frame addition processing by said image frame means, and directly outputs the original image held in said holding means.

28. The apparatus according to claim 23, wherein the image frame means adds the image frame to a boundary between the original image and the background.

29. The apparatus according to claim 28, wherein said image frame means adds the image frame by leaving a portion surrounding an original image in a background portion having a color different from a foundation color of the original image as a thin line, and converts a color of the remaining background portion into the foundation color of the original image.

30. The apparatus according to claim 22, further comprising storage means for storing the image data subjected to the image frame addition processing by said image frame means.

31. The apparatus according to claim 22, further comprising reading means for reading the original image together with a background having a color different from a foundation color of the original image.

32. The apparatus according to claim 22, wherein said holding means stores and holds a plurality of original images, and said image frame means performs the image frame addition processing for the original image read out from said holding means.

33. An image processing apparatus comprising:

holding means for storing and holding an original image;

detection means for detecting an outer shape of the original image stored and held in said holding means;

first image frame means for performing first image frame addition processing for the original image stored and held in said holding means in accordance with an outer shape detection result of said detection means;

determining means for determining whether or not an outer shape detecting result of said detection means is inappropriate for the first image frame addition processing;

second image frame means for performing second image frame addition processing for the original image stored and held in said holding means in a different manner from said first image frame means, and control means for controlling said first image frame means to inhibit the first image frame addition processing when said determining means determines that an outer shape detection result of said detection means is inappropriate for the first image frame addition processing and causes said second image frame means to perform the second image frame addition processing for the original image for which the first image frame addition processing is not performed by said first image frame means.

34. The apparatus according to claim 33, wherein said holding means holds an original image subjected to the second image frame addition processing by said second image frame means, when the first image frame addition processing by said first image frame means is requested with respect to the original image, the original image which has already been subjected to the second image frame addition processing and held in said holding means is output.

35. The apparatus according to claim 33, wherein said holding means holds original image information required for the second image frame addition processing in said second image frame means in association with the original image which is subjected to the second image frame addition processing by said second image frame means, and when the first image frame addition processing by said first image frame means is requested with respect to the original image, said second image frame means performs the second image frame addition processing on the basis of the original image information held in said holding means.

36. The apparatus according to claim 35, wherein a nonvolatile memory holds original image information required for the second image frame addition processing in said second image frame means in association with the original image which is subjected to the second image frame addition processing by said second image frame means.

37. The apparatus according to claim 33, wherein said first image frame means performs the first image frame addition processing in parallel with the reading operation of the original image from said holding means, and said second image frame means performs the second image frame addition processing after the reading operation of the original image from said holding means.

38. The apparatus according to claim 37, wherein the first image frame addition processing is implemented by hardware processing, and the second image frame addition processing is implemented by software processing.

39. The apparatus according to claim 33, wherein said holding means stores and holds the original image together with a background having a color different from a foundation color of the original image.

40. The apparatus according to claim 39, wherein each of said first and second image frame means adds an image frame indicating a boundary between the original image and the background.

41. An image processing method in an image processing apparatus for performing image frame addition processing for a held original image, comprising:

a step of detecting an outer shape of the held original image;

a step of performing image frame addition processing for the held original image in accordance with an outer shape detection result;

a step of determining whether or not an outer shape detection result is inappropriate for the image frame addition processing; and a step of controlling to inhibit the image frame addition processing when said determining step determines that an outer shape detection result is inappropriate for the image frame addition processing.

42. An image processing method in an image processing apparatus for performing image frame addition processing for a held original image, comprising:

a step of detecting an outer shape of the held original image;

a step of performing first image frame addition processing for the held original image in accordance with an outer shape detection result;

a step of determining whether or not an outer shape detection result is inappropriate for the first image frame addition processing;

a step of controlling to inhibit the first image frame addition processing when said determining step determines that an outer shape detection result is inappropriate for the first image frame addition processing; and a step of performing second image frame addition processing for the original image which is not subjected to the first image frame addition processing in a different manner from the first image frame addition processing.

* * * * *

UNITED STATES PATENT AND TRADEMARK OFFICE
CERTIFICATE OF CORRECTION

PATENT NO.  : 5,970,183
DATED       : October 19, 1999
INVENTOR(S) : MASAMI AMEMIYA ET AL.

Figure 21:
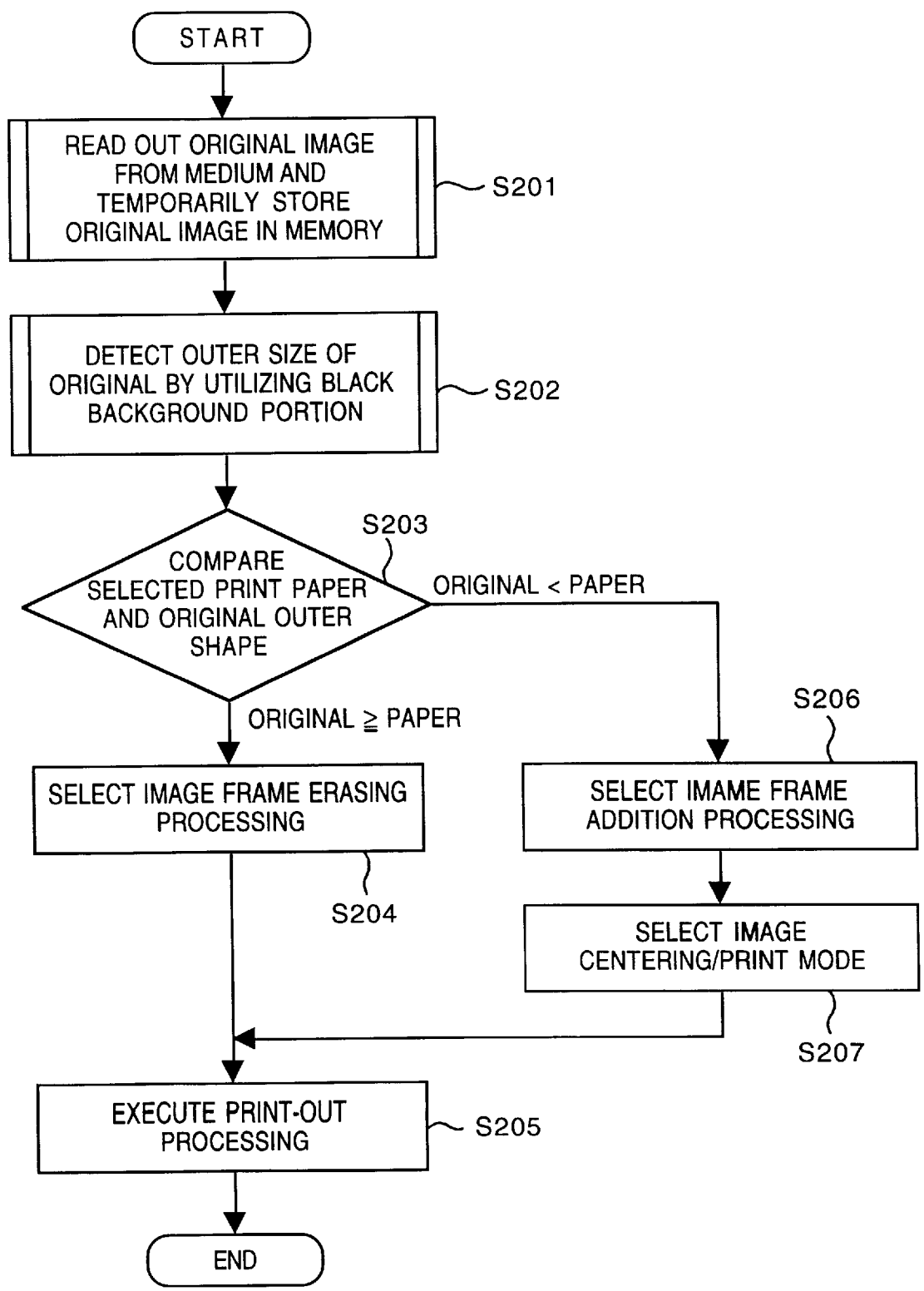
FIG. 21 is a flow chart showing the operation of the image reproduction apparatus according to the eighth embodiment.

It is certified that error appears in the above-identified patent and that said Letters Patent is hereby corrected as shown below:

IN THE DRAWINGS:

Sheet 21 of 29, FIG. 21, "IMAME" should read --IMAGE--.

COLUMN 10:

Line 64, "flat" should read --flag--.

COLUMN 17:

Line 17, "unit 400" should read --unit 1400--.

COLUMN 26:

Lines 45-48, close up left margin.

COLUMN 28:

Line 31, "perform" should read --performs--; and
    Line 39, "processing," should read --processing--.

UNITED STATES PATENT AND TRADEMARK OFFICE
CERTIFICATE OF CORRECTION

PATENT NO. : 5,970,183

DATED : October 19, 1999

INVENTOR(S) : MASAMI AMEMIYA ET AL.

It is certified that error appears in the above-identified patent and that said Letters Patent is hereby corrected as shown below:

<u>COLUMN 29</u>:

Line 17, "outer" should read --an outer--; and
    Line 30, "of," should read --of--.

Signed and Sealed this

Twenty-second Day of May, 2001

Attest:

NICHOLAS P. GODICI

Attesting Officer     *Acting Director of the United States Patent and Trademark Office*